United States Patent
Morimoto et al.

(10) Patent No.: US 8,260,120 B2
(45) Date of Patent: Sep. 4, 2012

(54) INFORMATION PROCESSING APPARATUS, INFORMATION PROCESSING METHOD, AND COMPUTER PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 11/993,912

(22) PCT Filed: Apr. 16, 2007

(86) PCT No.: PCT/JP2007/058297
§ 371 (c)(1),
(2), (4) Date: Dec. 26, 2007

(87) PCT Pub. No.: WO2007/129532
PCT Pub. Date: Nov. 15, 2007

(65) Prior Publication Data
US 2008/0199145 A1    Aug. 21, 2008

(30) Foreign Application Priority Data
May 10, 2006    (JP) .................................. 2006-132006

(51) Int. Cl.
*H04N 5/93*    (2006.01)
(52) U.S. Cl. ........................ 386/290; 386/278; 369/83
(58) Field of Classification Search .................... 386/52, 386/290, 278; 369/83
See application file for complete search history.

(56) References Cited

U.S. PATENT DOCUMENTS

| | | |
|---|---|---|
| 2002/0150383 A1 | 10/2002 | Kato et al. |
| 2003/0200452 A1* | 10/2003 | Tagawa et al. ................ 713/193 |
| 2003/0235402 A1* | 12/2003 | Seo et al. ......................... 386/95 |
| 2006/0013564 A1* | 1/2006 | Hamada et al. ................. 386/95 |
| 2006/0110111 A1* | 5/2006 | Van Gestel et al. ............ 385/95 |

FOREIGN PATENT DOCUMENTS

| | | |
|---|---|---|
| EP | 1 103 974 A2 | 5/2001 |
| EP | 1 103 974 A3 | 5/2001 |
| EP | 1 408 686 A1 | 4/2004 |
| JP | 2004-328450 | 11/2004 |
| JP | 2007-82088 | 3/2007 |
| JP | 2007-129368 | 5/2007 |
| WO | WO 2004/053875 A2 | 6/2004 |

* cited by examiner

*Primary Examiner* — Matthew Henning
*Assistant Examiner* — Brian Shaw
(74) *Attorney, Agent, or Firm* — Oblon, Spivak, McClelland, Maier & Neustadt, L.L.P.

(57) ABSTRACT

A stream on a recording medium is divided into parts, and is subjected to rearrangement editing while the compatibility with a playback-only device is maintained.

By adopting a division processing procedure of a play item, rearrangement processing of a stream for each chapter is achieved. In a product specification, a plurality of real play lists are put together into a series of chapter groups to be presented to the user, and thus there are cases where rearrangement of chapters are closed in the same play list, and cases where the rearrangement extends over a plurality of play lists. Moreover, rearrangement editing, which moves a chapter between real play lists, between virtual play lists, and further from a real play list to a virtual play list, is performed.

19 Claims, 16 Drawing Sheets

INFORMATION PROCESSING APPARATUS, INFORMATION PROCESSING METHOD, AND COMPUTER PROGRAM

TECHNICAL FIELD

The present invention relates to an information processing apparatus, an information processing method, and a computer program which perform edit processing of an information content recorded on a recording medium, and for example relates to an information processing apparatus, an information processing method, and a computer program which perform edit processing of a content, such as an AV stream captured by a video camera and stored on a recording medium.

More specifically, the present invention relates to an information processing apparatus, an information processing method, and a computer program which perform edit processing of a content, such as an AV stream stored on a recording medium so that the content does not become incompatible with a playback-only standard format, and in particular, relates to an information processing apparatus, an information processing method, and a computer program which maintain the compatibility among playback-only devices and performs rearrangement editing by dividing a stream on a recording medium into parts in accordance with the format of the stream.

BACKGROUND ART

A disc-type recording medium (in the following, called an "optical disc"), to which optical reading is applied, such as a DVD (Digital Versatile Disk), a CD (Compact Disk), etc., has rapidly become widespread for use in storing computer files and moving-image streams. An optical disc has a large storage capacity and is capable of random accessing. Also, unlike a contact-type magnetic recording medium, there is no concern for abrasion and damage on the recording face by reading, head crash, etc. Also, the disc surface is strong, and there is low risk of accidental data loss. In recent years, optical discs are widely used also for external recording media and external storage devices for computers.

A disc-type recording medium is capable of random accessing, and thus in the case of recording an AV stream, it is possible to find a favorite scene efficiently. At the same time, data is accessed in a non-contact manner, and thus it is possible to use the medium without deterioration.

Also, recently, with an increase in a recording capacity of a disc-type recording medium, video cameras of a type which store moving images into a disc have appeared in place of a known recording tape (for example, refer to Patent Document 1). For example, DVD video cameras have gained users expanding year by year since their appearance on the market in 2000 because of the excellence in image quality and user friendliness, for example having the capability of editing.

For example, in moving image data, a data block to be a unit which requires being played with assurance of a continuous synchronous play, namely a real-time play, constitutes one clip (Clip), which is recorded as one moving image file. With a moving-image play list (MoviePlayList), it is possible to specify individual play start points (IN points) and play end points (OUT points) for one or more clips to specify play sections and a play sequence of the moving image data. Also, it is possible to freely set reference relationships between clips and play lists. For example, it is possible to make a reference to a certain clip from two play lists having different IN points and OUT points. Furthermore, it is possible to freely set reference relationships between titles and moving image objects.

A moving-image play list is specified by a navigation command in a moving image object (MovieObject) to be played. A reference to a moving image object is listed in an index table as an entry of a title. The index table is the data read first when a recording medium is loaded into a player, and the user can view the titles described in the index table.

Here, on a large capacity recording medium of next generation type, for recording purposes, in consideration of user's convenience, it is desirable to enable the user to divide a moving image clip captured by a video camera into parts for each play section, and to perform editing, such as rearrangement of the parts on a recording medium, or deletion of a part of the parts. At the same time, there are requests to take out a recording medium, on which recording and edit operation have been performed, from a recording device, such as a video camera at any time, and to load the medium into a playback-only apparatus to view the captured moving image on a TV monitor.

In AVCHD (Advanced Video Coding High Definition), which is a standard mainly targeted for applications for a video camera, a determination is made on the design of the specification, such as on the data format for a high-definition (HD) video camera by adding functions of recording compatibility and recordable compatibility. Here, it is thought that it is necessary to define edit operations on a medium while maintaining the compatibility of a recording medium between a video camera and playback-only devices.

Also, rearrangement editing of contents include non-destructive editing in which only the positions of parts referenced on a play list viewed by the user are rearranged and the stream data on a recording medium is not edited, and destructive editing in which the positions of the parts themselves on a recording medium are rearranged. In the latter case, there is a problem with a stream format.

If two AV streams are continuously played back over the boundary, the internal buffer held by the decoder might overflow. Usually, the playback of a prior stream is terminated once, and then the next stream is played back. Thus, a screen freezes for a moment at the time of changing streams. In order to cope with this, it is possible to perform "seamless playback", which continuously plays back over streams, by encoding so that a predetermined buffer model is not broken down.

For an AVCHD stream file format, the MPEG (Moving Picture Experts Group)-2 system has been already determined. A MPEG2-TS (Transport Stream) stream does not cause a decoder to lose data at data playback time as long as the stream conforms to a predetermined MPEG buffer model, and thus seamless playback is possible. However, if streams are subjected to rearrangement editing by non-destructive editing, the connection condition allowing seamless playback is not met any longer between a prior part and a succeeding part. Thus, a defective image is output at the connection part at stream playback time.

Patent Document 1
Japanese Unexamined Patent Application Publication No. 2004-120364

DISCLOSURE OF INVENTION

Problems to be Solved by the Invention

It is an object of the present invention to provide, for example an excellent information processing apparatus, information processing method, and computer program which can perform edit processing preferably on a content, such as an AV stream captured by a video camera and stored on a recording medium.

It is another object of the present invention to provide an excellent information processing apparatus, information processing method, and computer program which can perform edit processing on a content, such as an AV stream stored on a recording medium so as not to be incompatible with a playback-only standard format.

It is another object of the present invention to provide an excellent information processing apparatus, information processing method, and computer program which can maintain the compatibility with a playback-only device, divide a stream on a recording medium into parts in accordance with a stream format, and perform rearrangement editing.

Means for Solving the Problems

The present invention has been made in view of the above-described problems, and according to a first aspect of the invention, there is provided an information processing apparatus for performing edit control of one or more AV streams recorded on a recording medium, the information apparatus including:

edit control means for editing a play list including an attribute definition file defining an AV stream attribute provided as a pair with each AV stream file recorded on a recording medium and a plurality of play section data specifying a play section of an AV stream by a play start point and a play end point;

access control means for placing one or more entry marks for a user randomly accessing play-section data arranged on a time axis in a play list, forming a chapter by a section between adjacent entry marks and a section from a last entry mark to an end point of a last play-section data in the play list, and accessing an AV stream recorded on a recording medium for each chapter; and play-list dividing means for dividing a chapter of a section defined by the user from the play list. The information processing apparatus divides a stream of a move section specified by the user, and moves the stream to the specified move destination to perform rearrangement editing.

In an information processing apparatus according to the present invention, an AV stream to be edited is, for example moving-image data captured by a video camera. The AV stream is recorded as a data block to be a unit necessary for being played with assurance of continuous synchronous play, namely, real-time play constitutes one clip. The clip includes a pair of a (clip) AV stream (ClipAVStream), which is a moving-image data main body, and a clip information file (ClipInformation) as an attribute definition file defining various attributes on the (clip) AV stream. Also, play-section data specifying a play section of an AV stream by a play start point and a play end point is called a play item (PlayItem). A play list, in which a plurality of play items are arranged on a time axis, and the play sequence of each play section is specified, becomes tiles to be shown to the user, that is to say, a play list (PlayList).

On the play list, one or more marks to be entry positions for the user are placed on a time axis on which the above-described play-section data are arranged. A chapter is formed by a section between adjacent marks, and a section from the last mark to the end of the last play-section data, and a deletion-edit instruction from the user is given for each chapter.

Also, there are two types of play lists. One is a real play list for original titles, which includes sequential registration of sections corresponding to an attribute definition file in accordance with the sequence of registering streams on a recording medium in play-section data, and a user-defined virtual play list which is created by non-destructive editing of one or more play-section data referring to a section of an attribute definition file registered in any one of the real play lists.

Specifically, the present invention relates to an information processing apparatus for performing rearrangement editing on an AV stream recorded on a recording medium in compliance with the AVCHD standard while maintaining compatibility with the AVCHD standard format.

For an AVCHD stream file format, the MPEG-2 system has been already determined. However, when streams on a recording medium are divided into parts, and the streams are subjected to rearrangement editing by non-destructive editing, the connection condition allowing seamless playback held by the original stream is not met any longer. Thus, a defective image is output at the connection part at stream playback time.

In order to cope with this, in the information processing apparatus according to the present invention, for example, a chapter instructed by the user as a move section is divided from the play-section data arranged on the time axis, and the chapter is inserted into the beginning position of the chapter specified as a move destination.

At this time, if at least one of entry mark positions of front and back ends of a chapter specified as a division section by the user does not match a boundary of the play-section data, it is not possible to move only the relevant chapter section without change. Thus, an information processing apparatus according to the present invention includes play-section data dividing means that divides the chapter of the section instructed by the user from the play-section data arranged on the time axis. When at least one of entry mark positions of before and after a chapter specified as a division section by the user does not match a boundary of the play-section data, the play-list dividing means once divides the play-section data including the division section at the entry mark position, and divides a chapter of the division section as a play list.

The play-list dividing means can divide play-section data by, for example making a copy of the play-section data to be divided, rewriting a play end position of the original play-section data to the entry mark position, and rewriting a play start position of the copied play-section data to the entry mark position.

Also, an information processing apparatus according to the present invention further includes play-section data deletion means for deleting the chapter of the section specified by the user, and if at least one of entry mark positions of front and back ends of a chapter specified as a division section by a user does not match a boundary of the play-section data, the play-list dividing means divides the play-section data including a deletion section at the entry mark position, and then the play-section data deletion means deletes the play-section data corresponding to the deletion section.

Also, an information processing apparatus according to the present invention further includes play-section data insertion means for inserting play-section data at the beginning position of a chapter specified by a user on the play list, and if a beginning entry mark position of a chapter specified as an insertion position of the play-section data by the user does not match a boundary of the play-section data, the play-list dividing means divides the play-section data at the entry mark position, and then the play-section data insertion means inserts play-section data before the entry mark position.

Accordingly, by an information processing apparatus according to the present invention, when rearranging chapters on a play list is instructed, it is possible to move chapters by the play-list dividing means dividing the chapter to be a move section and the play-section data insertion means inserting this section to a move-destination, and thus it is possible to divide a stream stored in a recording medium into parts to achieve rearrangement.

The play-section data has information indicating whether a connection condition with play-section data immediately before is seamless-playable. Accordingly, it is necessary for the play-list dividing means to release a seamless-playback setting of the beginning play-section data of a division section with play-section data immediately before, and to release a seamless-playback setting of the beginning play-section data of a backside of the division section with play-section data immediately before.

Also, it is necessary for the play-section data deletion means to release a seamless-playback setting of the beginning play-section data of a backside of the deletion section with play-section data immediately before.

In the same manner, it is necessary for the play-section data insertion means to release a seamless-playback setting of the beginning play-section data of a backside of the insertion position with play-section data immediately before.

In a product specification, a plurality of real play lists are put together into a series of chapter groups to be presented to the user. Thus, there are cases where rearrangement of chapters is closed in the same play list, and cases where the rearrangement extends over a plurality of play lists.

When the play-section data rearrangement means rearranges chapters among a plurality of play lists, the play-section data rearrangement means divides a chapter in a section instructed to be rearranged in a move-source play list by the play-list dividing means, then inserts the divided play-section data at the beginning position of a chapter specified for a move destination in a move-destination play list by the play-section data insertion means, and deletes the divided play-section data from the move-source play list by the play-section data deletion means. Thus, it is possible to achieve rearrangement of chapters.

When the rearrangement extends over a plurality of play lists, the reason why the moving of chapter groups are carried out by the two phases, the insertion of chapter groups and the deletion of chapter group in this manner is that consideration is given to the design items of apparatuses which load data on a recording medium into a memory for each play list, and do not load the information of two play lists or more into a memory at the same time.

Usually, an upper limit of the number of play-section data is set on a recording medium. Thus, the play-section data rearrangement means should reserve division processing by the play-list dividing means, reserve insertion processing by the play-list insertion means, reserve deletion processing by the play-section data deletion means, and executes each reserved processing if a total number of the play-section data is not over the condition in the move-source and the move-destination play lists.

Also, each play-section data in a play list has each sequence number, and each entry mark has reference information to a sequence number of the corresponding play-section data. Thus, it is necessary for the play-list dividing means to rewrite the reference information to the play-section data of the entry mark from the divided entry mark and after.

In the same manner, it is necessary for the play-section data deletion means to rewrite the reference information to the play-section data held by the entry mark in relation to deletion of the play-section data.

In the same manner, it is necessary for the play-section data insertion means to rewrite the reference information to the play-section data of the entry mark in relation to insertion of the play-section data.

In the same manner, it is necessary for the play-section data rearrangement means to rewrite the reference information to the play-section data of the entry mark in relation to moving the play-section data in the play-section data.

According to a second aspect of the present invention, there is provided a computer program described in a computer-readable format to cause a computer to execute processing for performing edit control of one or more AV streams recorded on a recording medium, the processing including the steps of:

edit controlling for editing a play list including an attribute definition file defining an AV stream attribute provided as a pair with each AV stream file recorded on a recording medium and a plurality of play section data specifying a play section of an AV stream by a play start point and a play end point;

access controlling for placing one or more entry marks for a user randomly accessing play-section data arranged on a time axis in a play list, forming a chapter by a section between adjacent entry marks and a section from a last entry mark to an end point of a last play-section data in the play list, and accessing an AV stream recorded on a recording medium for each chapter; and play-list dividing for dividing a chapter of a section defined by the user from the play list.

A computer program according to the second aspect of the present invention is a defined computer program described in a computer-readable format so as to achieve predetermined processing on a computer. In other words, by installing a computer program according to the second aspect of the present invention, a cooperative operation is exercised on that computer, and the same operation effects as those of the information processing apparatus according to the first aspect of the present invention can be obtained.

Advantages

By the present invention, it is possible to provide an excellent information processing apparatus, information processing method, and computer program which can perform edit processing on a content, such as an AV stream stored on a recording medium so as not to be incompatible with a playback-only specification format.

Also, by the present invention, it is possible to provide an excellent information processing apparatus, information processing method, and computer program which can maintain the compatibility with a playback-only device, divide a stream on a recording medium into parts in accordance with a stream format, and perform rearrangement editing.

Also, by the present invention, it is possible to move a chapter in the same play list, or among a plurality of play lists, and to perform rearrangement editing. It is possible, as a matter of course, to perform rearrangement editing which moves a chapter between real play lists, between virtual play lists, and further from a real play list to a virtual play list.

Other and further objects, features and advantages of the present invention will become apparent by the detailed description based on the following embodiments of the present invention and the accompanying drawings.

Figure 1:
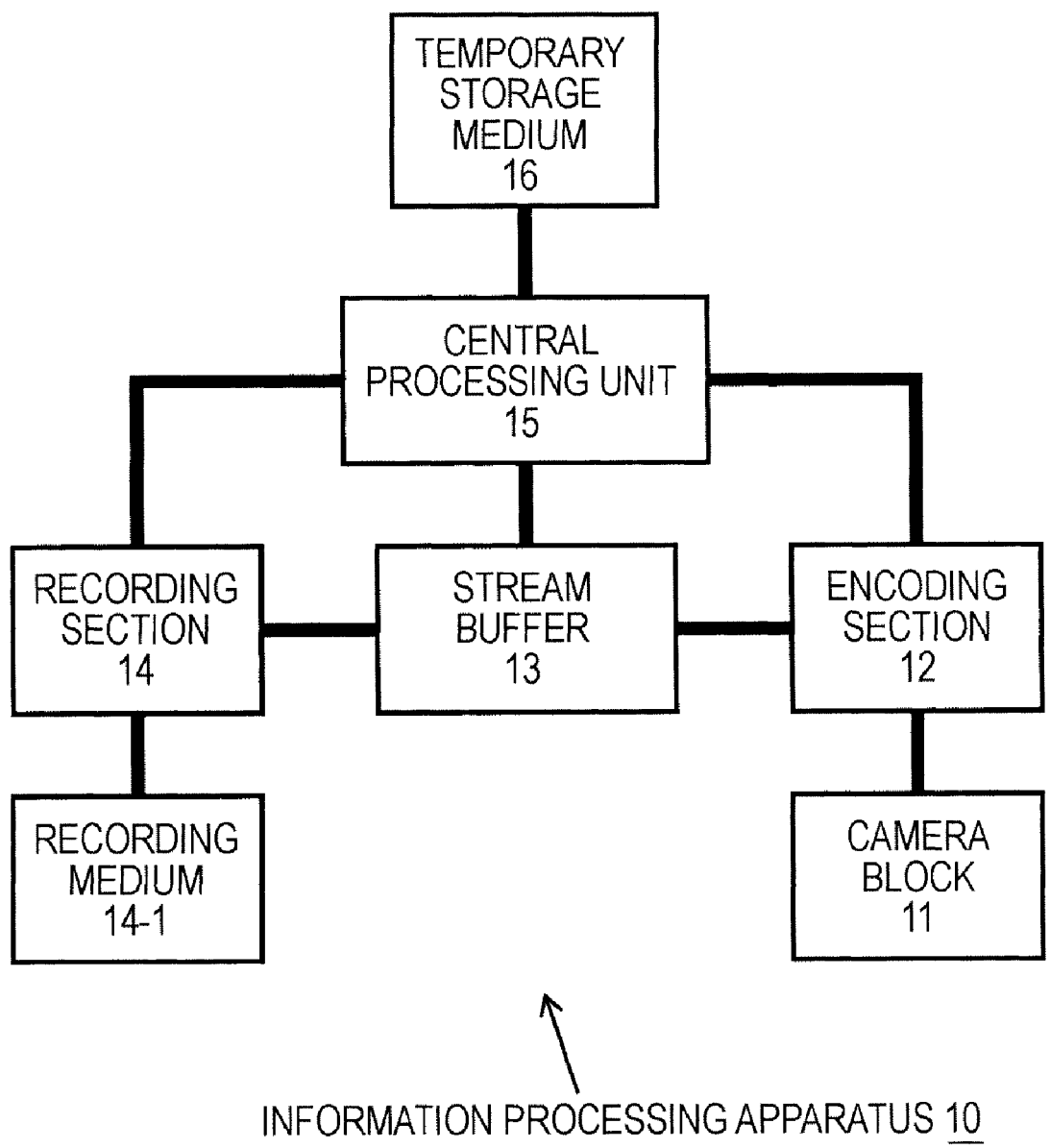
FIG. 1 is a diagram schematically illustrating a functional configuration of an information processing apparatus 10 according to an embodiment of the present invention.

| Reference Numerals | |
|---|---|
| 10 | information processing apparatus |
| 11 | camera block |
| 12 | encoding section |
| 13 | stream buffer |
| 14 | recording section |
| 14-1 | recording medium |
| 15 | central processing unit |
| 16 | temporary recording medium |

BEST MODE FOR CARRYING OUT THE INVENTION

In the following, a detailed description will be given of an embodiment of the present invention with reference to the drawings.

A. System Configuration

FIG. 1 schematically illustrates a functional configuration of an information processing apparatus 10 according to an embodiment of the present invention.

The information processing apparatus 10 shown in the figure is configured as a video camera in which a moving-image stream captured by a camera block 11 is encoded into an MPEG-TS stream by an encoding section 12, and this stream is recorded onto a recording medium 14-1 loaded in a recording section 14. However, the information processing apparatus 10 is not necessarily a video camera, and may be an information processing unit receiving a moving-image stream through a LAN and the other transmission medium. Also, in the case where a TS stream coded in an MPEG format is received, the encoding section 12 is omitted, and the configuration including a stream receiving section (not shown in the figure) is used instead. Also, the recording medium 14-1 is not limited to a DVD, and the type of medium is not specifically restricted if the recording medium has a sufficient recording capacity capable of storing a stream file.

A central processing unit 15 totally controls processing operations of the entire information processing apparatus 10 in the form of loading execution programs in a temporary storage medium 16 including a RAM (Random Access Memory), etc., temporarily storing system variables and environment variables, and executing the programs. The processing operations mentioned here include moving-image capturing by the camera block 11 and accompanying camera work, such as an automatic focus function, an automatic exposure, camera-shake correction, automatic shutter, recording a moving-image stream into the recording medium 14-1 in the recording section 14, and edit processing of a stream recorded on the recording medium 14-1, and the like.

The edit processing mentioned here means editing, such as deletion of a partial section of a stream on a recording medium, dividing a stream into parts for moving and rearrangement, etc. Also, the edit processing included both destructive editing which processes a stream itself on a recording medium and non-destructive editing which edits only reference information to a playback section of a stream. As a specific embodiment of the present invention, recording and edit processing of a stream into the recording medium 14-1 is performed in accordance with the AVCHD standard, and the details on this point is described later.

The encoding section 12 encodes a moving-image stream into the MPEG-2 format, and outputs a TS stream made of fixed packet-length TS packets. (Alternatively, the encoding section 12 receives TS packets from an external apparatus through a transmission medium, such as a LAN.) The TS packets are once stored in a stream buffer 13, and the recording section stores the packets onto the recording medium 14-1. The time interval at which the recording section 14 receives TS packets from the encoding section 12 is various.

When a recorded stream is played back, TS packets read from a medium is input into a buffer (not shown in the figure) once, and then is decoded. It is necessary to transmit packet data to the receiving side while adjusting a time interval in consideration of a state of this buffer such that an overflow and an underflow will not occur in the decoder buffer of a playback apparatus. Thus, information on the arrival time of each packet data transmitted to a recording device, namely ATS is inserted into every packet, and the packet data is played back on the basis of the information on the arrival time (well known).

When the recording section 14 receives TS packet data at a specific time interval through the stream buffer 13, the recording section 14 records this on the recording medium 14-1. In order to play back recorded TS packets, it is necessary to have an arrival-time clock (ATC) counter for transmitting packet data to the decoder of the playback apparatus side at the same time interval as the above-described specific time interval. Thus, when a TS stream is recorded onto the recording medium 14-1, the ATS is added to each TS packet on the basis of the counter value generated by the ATC counter. Also, at the time of data playback, TS packets are output in sequence on the basis of ATS.

B. Data Format

Moving image data captured by a video camera is recorded as a pair of a clip AV stream and a clip information file defining the attributes thereof.

Figure 18:
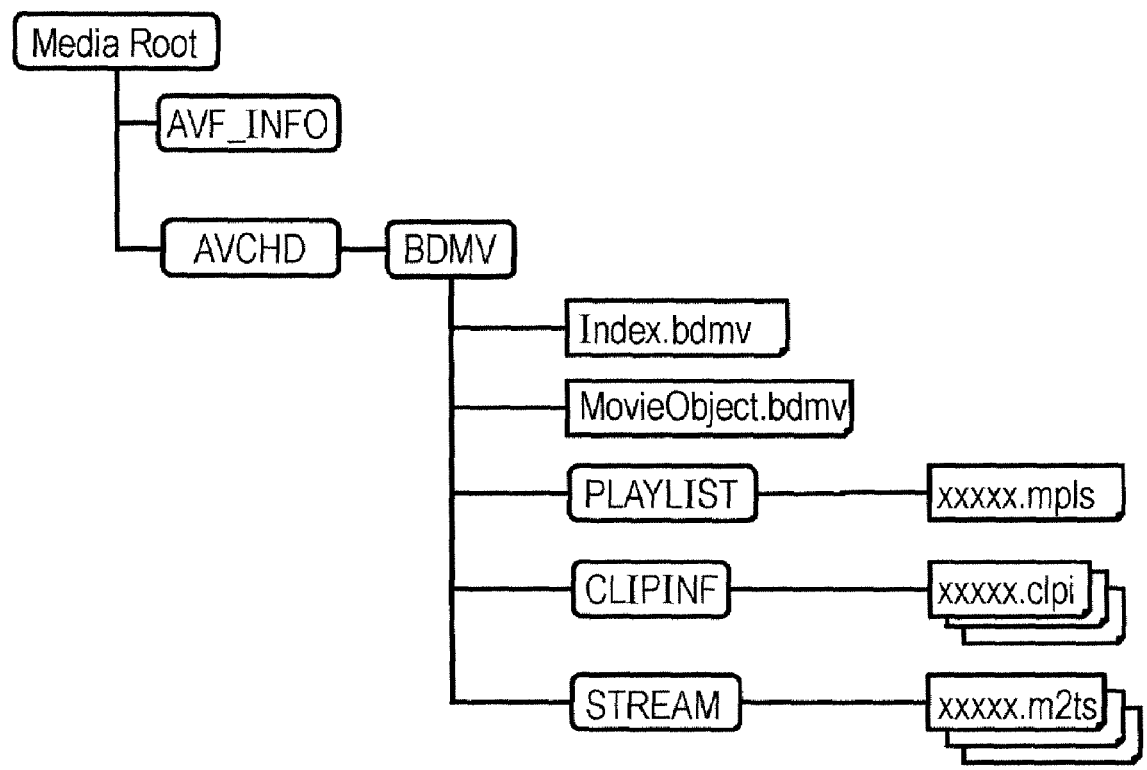
FIG. 18 is a diagram illustrating a directory configuration of a recording medium 14-1 defined by the AVCHD standard.

FIG. 18 illustrates the directory configuration of a recording medium 14-1 defined by the AVCHD standard. "PLAYLIST", "CLIPINF", and "STREAM" placed immediately under the BDMV directory are sub-directories for storing a play list, a clip information file, and a clip AV stream file, respectively.

In moving image data, a data block to be a unit necessary for being played with assurance of continuous synchronous play, namely, real-time play constitutes one clip (Clip), and the data is recorded as one moving image file. The clip AV stream is a file in which a moving-image stream is stored in an MPEG2-TS format. Also, the clip information file is provided as a pair with the clip AV stream file, and is a file in which necessary information on a moving-image stream for playing back a real moving-image stream is described. The play list includes a plurality of play items (PlayItem). Each play item specifies a play start point (IN point) and a play end point (OUT point) individually, and the play section and the play sequence of moving image data is specified by a sequence of play items in a play list.

Figure 2:
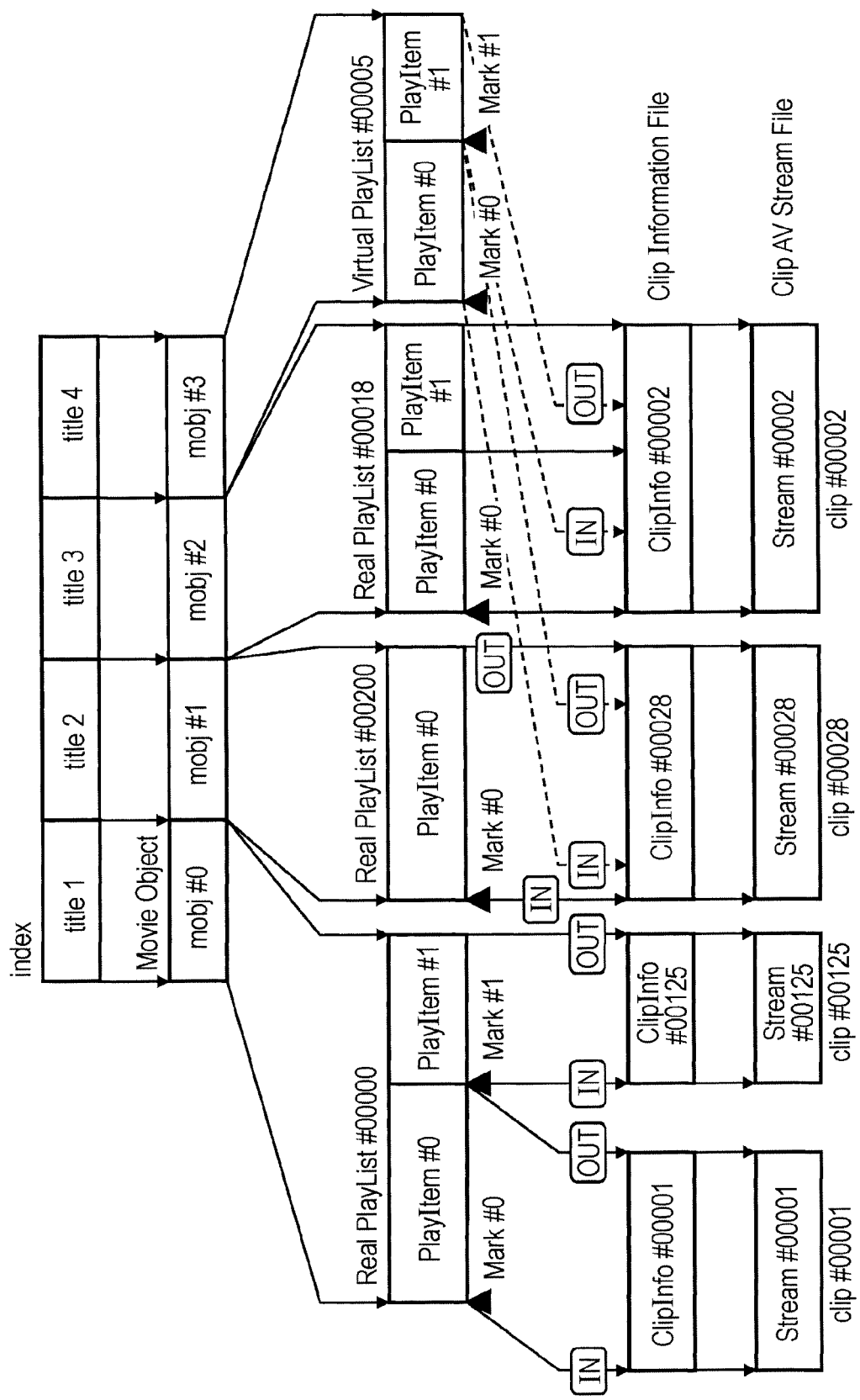
FIG. 2 is a diagram illustrating an example of a data structure for recording data onto a recording media 14-1.
Figure 3A:
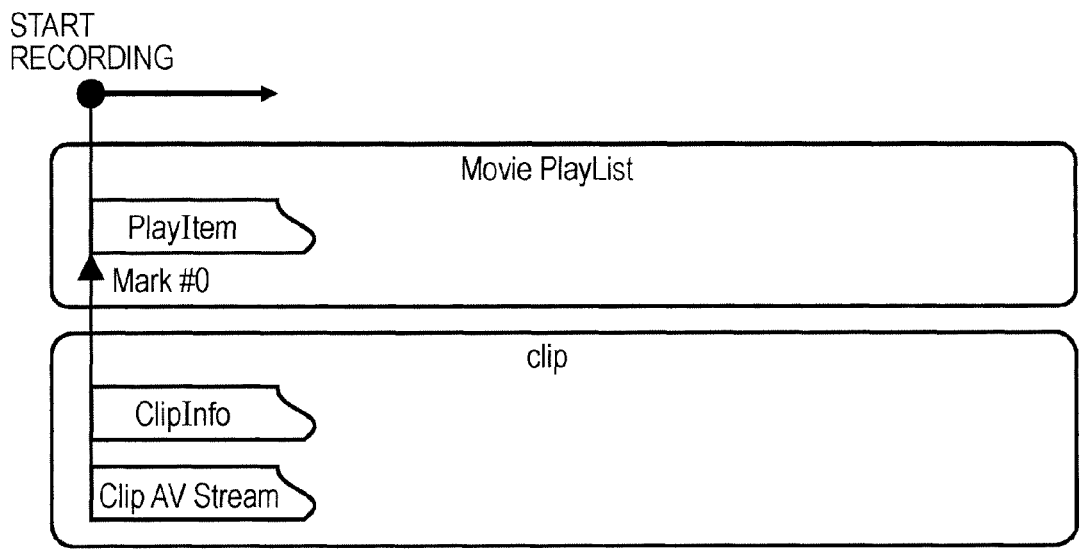
FIG. 3A is a diagram for explaining a procedure in which a play list is generated along with a clip of a clip AV stream in accordance with recording and shooting by a video camera.
Figure 3B:
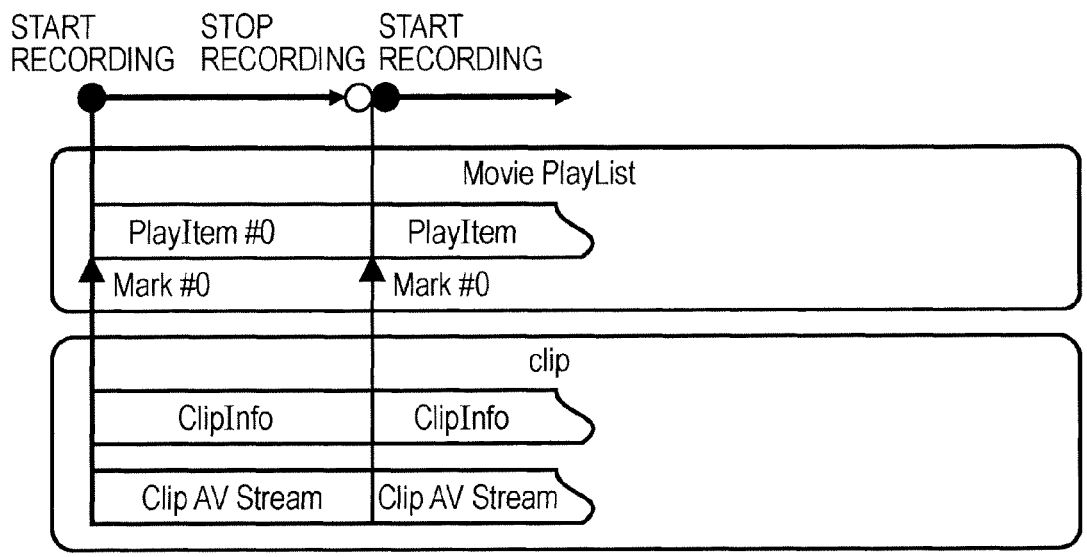
FIG. 3B is a diagram for explaining a procedure in which a play list is generated along with a clip of a clip AV stream in accordance with recording and shooting by a video camera.
Figure 3C:
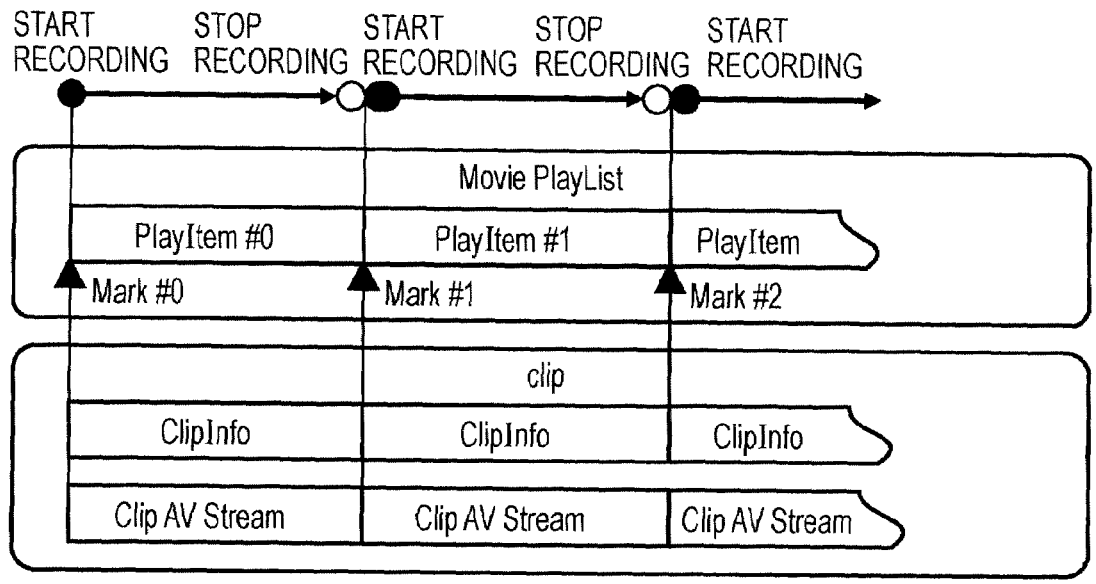
FIG. 3C is a diagram for explaining a procedure in which a play list is generated along with a clip of a clip AV stream in accordance with recording and shooting by a video camera.
Figure 3D:
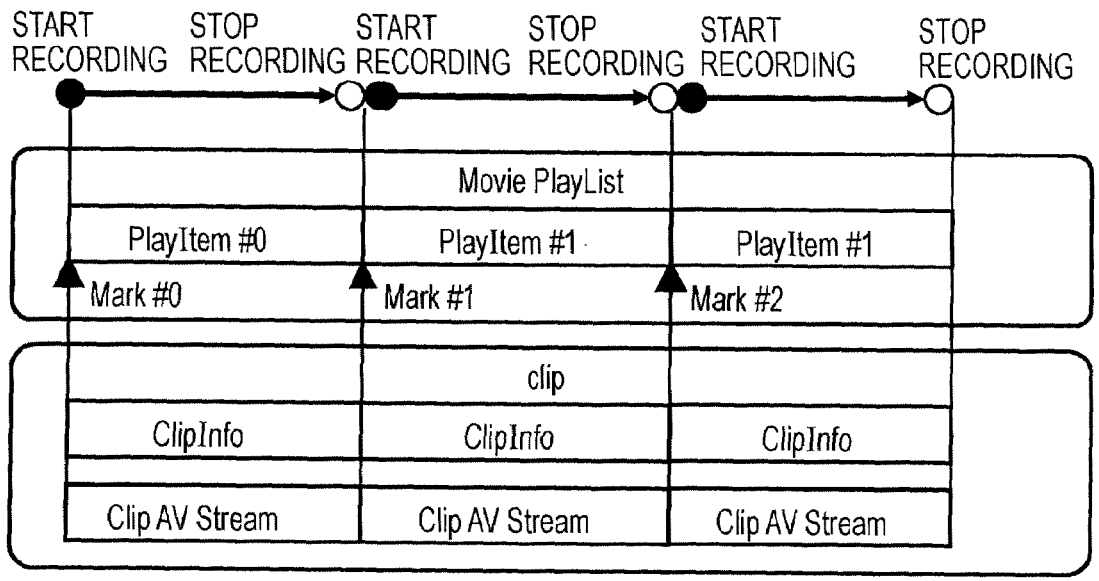
FIG. 3D is a diagram for explaining a procedure in which a play list is generated along with a clip of ClipAVStream in accordance with picture recording and taking by a video camera.

FIG. 2 illustrates an example of a data structure for recording user data onto a recording media 14-1 in a format allowing recording and editing. As shown in the figure, when a moving-image stream captured by a video camera is encoded into an MPEG2-TS format and recorded, files of various types, such as an index (index), a moving image object (MovieObject), a play list (PlayList), clip information (ClipInformation), and a clip AV stream (ClipAVStream) are used.

TABLE 1

| File Type | Maximum Number | Role |
| --- | --- | --- |
| Index | 1 | Essential file managing the entire medium. Relationships between titles to be displayed to the user and moving-image objects are managed. In the AVCHD format, the play sequence of the play lists to be originally managed by moving-image objects is managed in the meta data of an index file. |
| Moving-Image Object | 1 | File which manages a play list to be played when the title is specified. |
| Real Play List | Total 2000 | Play list for original title. Recorded and played videos are registered in the recording sequence. |
| Virtual Play List | | Play list for creating a user-defined play list by non-destructive editing. Virtual play list does not have its own clips, and specifies clips registered in any real play list to be played. |
| Clip Information | 4000 | Provided as a pair with a clip-AV-stream file, and includes description of information on a stream necessary for playing a real stream. |
| Clip AV Stream | 4000 | File which stores a stream recorded by MPEG2-TS. AVC image data is stored in this file. |

The entire storage area on the recording medium 14-1 is managed in the index (index.bdmv) file-type layer. An index file is created for each tilt to be displayed to the user, and a relationship with a moving image object is managed. The "title (Title)" mentioned here is a collection of (user-recognizable) play lists, and in general, is made of one program or a content for each date. In the AVCHD standard format, a play sequence of play lists, which should be originally managed by a moving-image object file is managed in meta data of an index file. When a recording medium is loaded into a player, an index is read first and the user can view the titles described in the index.

A moving-image object is a collection of commands for performing play control, and for example, is a file managing a play list which is played when the title is specified in the existing ROM standard format. The references to moving-image objects are listed in an index as entries to the titles. However, in the AVCHD standard format, a relationship between a play list and a tile is managed by the meta data of the index file without referring to the moving-image object file.

A play list is provided corresponding to a title to be displayed to the user, and includes one or more play items (PlayItem). Each play item has play-section data including a play start point (IN point) and a play end point (OUT point), and thus specifies a play section of a clip AV stream. It is possible to specify a play sequence of each play section by arranging a plurality of play items on a time axis in a play list. Also, it is possible to include play items specifying play sections by different clip AV stream files in one play list. In other words, an entity corresponding to play list group included in one play list is not necessarily one clip AV stream file, and play items referring to different clips with each other can be included in one play list.

A reference relationship between a clip and a play list can be freely set. For example, references to one clip can be made from two PlayLists having different IN points and OUT points. Furthermore, a reference relationship between a title and a moving-image object can be freely set. A play list is roughly divided into two types, a real play list (RealPlayList) and a virtual play list (VirtualPlayList) depending on a reference relationship with a clip.

A real play list is a play list for an original title, and has play items, recorded in a recording sequence, on video streams recorded and captured by a video camera.

A virtual play list is a play list for creating a user-defined play list by non-destructive editing, and does not have an individual clip (AV stream) of the virtual play list. A play item in the virtual play list indicates a clip or a part of the range thereof registered in any one of the real play list. That is to say, it is possible for the user to cut out only necessary play sections from a plurality of clips, and to edit a virtual play list by collecting (copying) individual play items indicating these.

A clip is a moving-image data file recorded as a data block to be a unit which requires being played with assurance of a continuous synchronous play, namely a real-time play, and includes a clip AV stream file (Clip AV Stream) and a clip information file (Clip Information).

A clip AV stream as content data is a file in which streams recorded in a recording medium 14-1 in the MPEG-TS format. AVC image data is stored in this file.

A clip information file is provided as a pair with the clip AV stream file, and is a file which defines attributes on a moving-image stream and becomes necessary for playing back a real moving-image stream. Specifically, information for defining an encoding method of a moving-image stream, a size of a moving-image stream, conversion from play time to address, play management information, a time map (note in the case where a recording medium is a DVD), etc., is included in the clip information file.

As already described with reference to FIG. 18, in the directory configuration defined by the AVCHD standard, "PLAYLIST", "CLIPINF", and "STREAM" are placed immediately under the BDMV directory, and are used for storing a play list, a clip information file, and a clip AV stream file, respectively.

Next, with reference to FIGS. 3A to 3D, a description will be given of an example of the procedure in which clips of a clip AV stream and a play list are generated in accordance with recording and shooting by a video camera.

As shown in the figure, one play item is created for each section produced by the user from the start of recording to the stop of recording. For example, a section produced from the start of recording first to the stop of recording is registered as a play item (PlayItem#0) having a serial number 0 in the moving-image play list (MoviePlayList). Furthermore, a section produced from the start of recording next to the stop of recording is registered as a play item (PlayItem#1) having a serial number 1 in the moving-image play list (Movie PlayList) (the same in the following).

A real play list has a one-to-one relationship with an entity content, that is to say, a clip AV stream. Individual play items registered in a real play list hold time information of a play start point and a play end point of the individual play sections of the clip AV stream. Also, in a moving-image stream, such as MPEG2-TS, it is possible to perform "seamless playback", which continuously plays back over streams, by encoding such that a predetermined buffer model is not broken down by, for example an underflow and an overflow of an internal buffer, etc. Each play item (note that a beginning play item of a play list is excluded) holds a connection condition (that is to say, whether seamless playback is possible) with a play item immediately before.

Also, each time the user starts recording, a Mark as an entry mark (entry mark) is added to the beginning of a play item (called a "play list mark (PLM)" by putting an entry mark and a link point in a play list) (in the following, a link point is not essential, thus the description thereof is omitted, and it is assumed that all of them are entry marks). A play list is provided with one or more play list marks therein, and each mark has a role of pointing to a specific play position in each clip AV stream. In one play list, each play list mark is provided with a consecutive serial number along a time axis. Also, each play list mark registered in a play list has a serial number of a play item with a relevant mark and time-stamp information indicating a play position of a clip AV stream.

A segment of a recorded and image-capture stream becomes one clip AV stream file. One clip AV stream becomes a unit which requires being played with assurance of a continuous synchronous play, namely a real-time play. Also, together with this, a clip information file for defining an encoding method of a moving-image stream, a size of a moving-image stream, conversion from play time to address, play management information, a time map (note in the case where a recording medium is a DVD), etc., is created.

By what operation a stream is segmented is not directly related to the gist of the present invention, and thus the description thereof is omitted here. Also, one clip AV stream file can be divided into two files or more, but a description on this point will be given later.

In this regard, there is a restriction that a play list mark is indispensably attached to the beginning of a moving-image play list (MoviePlayList), but the position of a play list mark can be moved on a time axis by a predetermined edit operation.

Each play list mark becomes an entry position by which the user accesses a stream. Accordingly, a section segmented by adjacent entry marks (and a section from the last play list mark to the end of the last play item) becomes a minimum edit unit view by the user, that is to say, a "chapter". The play sequence of each section of clip AV streams registered in a play list is defined by arranging play items by a play sequence and by arranging play list marks by a desired play sequence.

In a product specification, a plurality of real play lists are put together into a series of chapter groups to be presented to the user. For example, on a edit screen of a video camera, an edit environment for each chapter is presented to the user by displaying a list of thumbnails (or thumbnail moving images having play list mark positions as play start positions) of still-image frames of individual play list mark positions defining chapters. There are cases where rearrangement of chapters is closed in the same play list, and cases where the rearrangement extends over a plurality of play lists. The details on the rearrangement processing of chapters will be described later.

When a certain play list is played back, if two AV streams are continuously played back across the boundary, the internal buffer held by the decoder might overflow, and thus, usually, the playback of a prior stream is terminated once, and then the next stream is played back. Accordingly, a screen freezes for a moment at the time of changing streams.

In order to cope with this, in the case where a specific condition is met, it is possible to perform "seamless playback", which continuously plays back across streams. In order to create a seamless-playable stream, there is a method of encoding, in which encoding is performed such that a predetermined buffer model is not broken down by transferring a buffer state at the time of completion of the recording of previous clip AV stream to an encoder at the time of starting the recording of the next clip AV stream. The information for encoding a seamless-playable stream, that is to say, seamless information differs depending on a method of encoding and a system specification of a device, but can be roughly listed as shown in the following table.

TABLE 2

| Information | Contents |
| --- | --- |
| VIDEO INPUT BUFFER VALUE | Storage Amount [Byte] of STD Video Buffer at previous recording time |
| AUDIO INPUT BUFFER VALUE | Storage Amount [Byte] of STD Audio Buffer at previous recording time |
| VIDEO END PTS | PTS [90 kHz] Video at previous recording time |
| AUDIO END PTS | PTS [90 kHz] Audio at previous recording time |
| VIDEO END DTS | PTS [90 kHz] Video at previous recording time |
| END SCR BASE | SCR VALUE [90 kHz] at previous recording time |
| END SCR EXT | Fractional Figure [27 kHz] of SCR value at previous recording time |

When a content title, namely, one play list includes a plurality of play items, a play item includes a connection condition (Connection Condition (CC) flag) to the play item immediately before, that is to say, a description of whether a clip AV stream can be played back seamlessly (continuously). Also, a clip information file includes a description of a file name of the succeeding clip information file and the connection condition. The connection condition to the succeeding clip information file is indicated by a value described in the Connection Condition field. If the Connection Condition field=1, it means discontinuous, and if it is 5 or 6, it means continuous (the Connection Condition is described in the clip information file only when it is 5).

C. Rearrangement Editing of Contents on Recording Medium

On a disc-type recording medium, when a use for a video camera is considered, for use in recording, it is desirable to allow editing in which content streams captured by a recording device, such as a video camera are divided into parts, moved and rearranged, or a portion of the parts is deleted. On the other hand, when a use for taking out a recording medium from a video camera and playing a moving image by an AVCHD playback-only device is considered, it is desirable that the edit result is not incompatible with a play-back only format, specifically, that the data structure produced by editing on a video camera having the AVCHD specification conforms to the AVCHD standard.

In the following, a detailed description will be given of the processing for editing data on a recording medium while conforming to the AVCHD standard by particularly focusing on the case of moving parts and performing rearrangement editing.

In this regard, in the AVCHD standard, a play list has a real/virtual attribute, which is a real play list or a virtual play list. A method of rearrangement processing described below is basically common for the real/virtual attribute. Also, it is assumed that PlayList_playback_type, which defines the play sequence, indicates the rearrangement in "Sequential Playback of PlayItem" (in Random/Shuffle, the definition of sequence has no meaning).

A unit for registering a clip AV stream in a play list is a play item, and a unit by which a stream is moved and rearranged on a recording medium is a play item. In contrast, an entry point at which the user accesses a recording medium is the position where a play list mark is added on the time axis on which play items are arranged, and a chapter made of a section between adjacent play list marks (and a section from the last Mark to the end point of the last play item) is a minimum edit unit for the user.

When the user specifies to move a chapter, or rearrangement, if both ends of the play item and the play list mark position do not match, it is not possible to perform the moving of the chapter specified as a move section without change. Thus, in such a case, the play item including a chapter specified to be moved is subjected to division processing at the play list mark position of the chapter, and then the relevant chapter is moved.

Figure 4A:
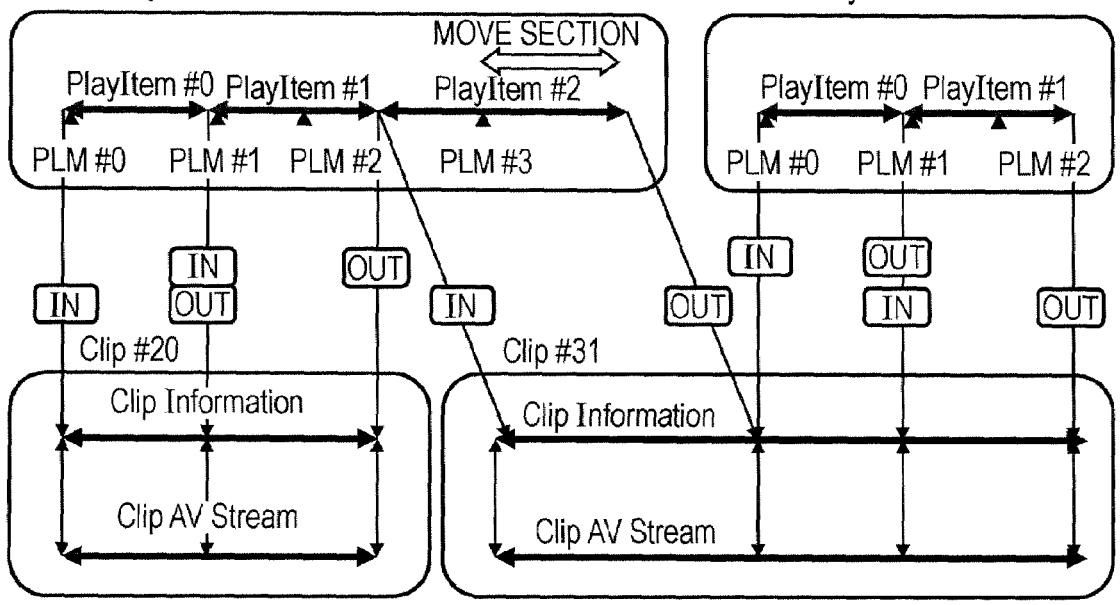
FIG. 4A is a diagram illustrating a file structure on a recording medium.

Here, suppose there is the case where recording has been performed by a file structure as shown in FIG. 4A on a recording medium. In the example shown in the figure, a moving-image play list#10 and moving-image play list#11 are stored as titles on a recording medium.

The moving-image play list#10 includes play items PlayItem#0 to #2, and among these, play items PlayItem#0 to #1 has a clip AV stream stored as a clip#20 as an entity, and the PlayItem#1 has a partial section from the beginning of a clip AV stream stored as a clip#31 as an entity. Also, play list mark (PLM)#0 to #3 shown by ▲ in the same figure are entry positions to individual chapters, and a section between adjacent play-list marks and a section from the last play-list mark to the end point of the last play item becomes a chapter of the relevant moving-image play list#10.

At the same time, the moving-image play list#11 includes play items PlayItem#0 to #1, and among the clip AV stream stored as a clip#31, the section following the section used by the moving-image play list#10 is entities of the individual play items. Also, play list mark (PLM)#0 to #2 shown by ▲ in the same figure are entry positions to individual chapters, and a section between adjacent play-list marks and a section from the last play-list mark to the end point of the last play item becomes a chapter of the relevant moving-image play list#11.

Figure 4B:
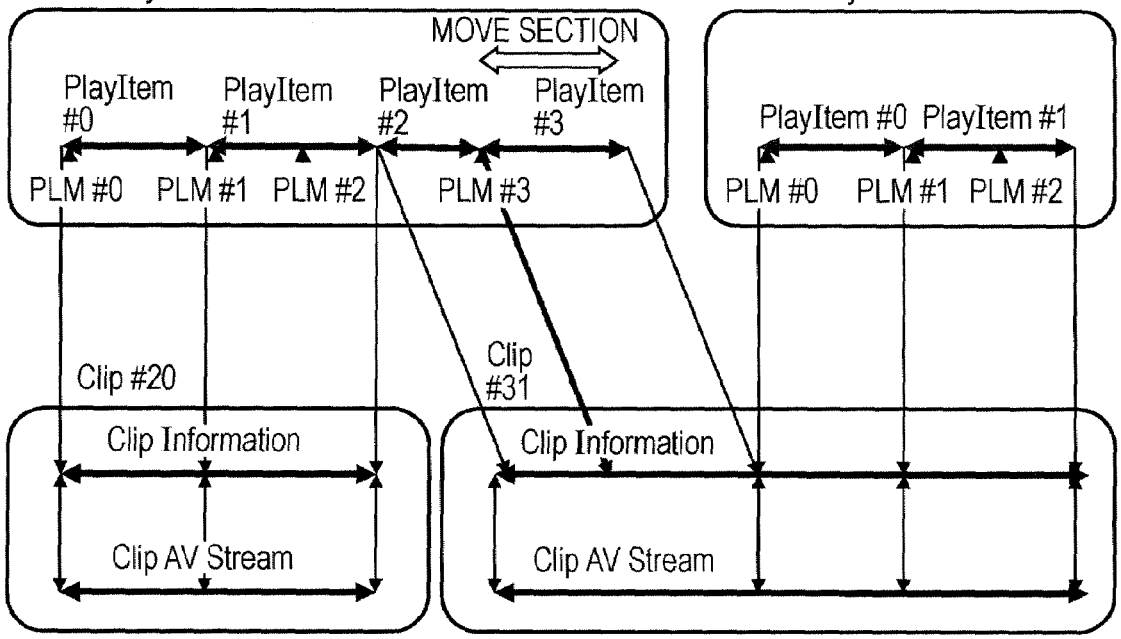
FIG. 4B is a diagram illustrating a state in which a chapter is moved in a play list in the file structure shown in FIG. 4B.

As shown in FIG. 4A, it is assumed that a chapter for PLM#3 to the end point of the play item PlayItem#2 is specified for a move section. PLM#1 matches the start point of the play item PlayItem#1, but PLM#3 does not match both ends of the play item PlayItem#2. In such a case, as shown in FIG. 4B, the play item PlayItem#2 is once divided into two at the position of PLM#3 at a boundary, the front part is set to the play item PlayItem#2, and the back part is set to the play item PlayItem#3.

Figure 5:
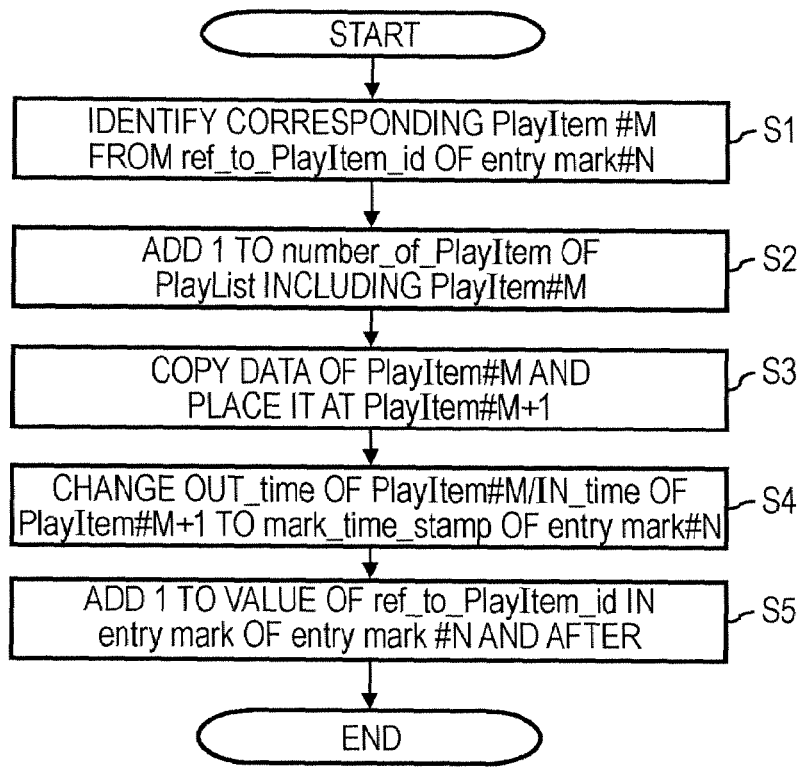
FIG. 5 is a flowchart illustrating a processing procedure for dividing a play item at a play-list mark position in the middle part.
Figure 6:
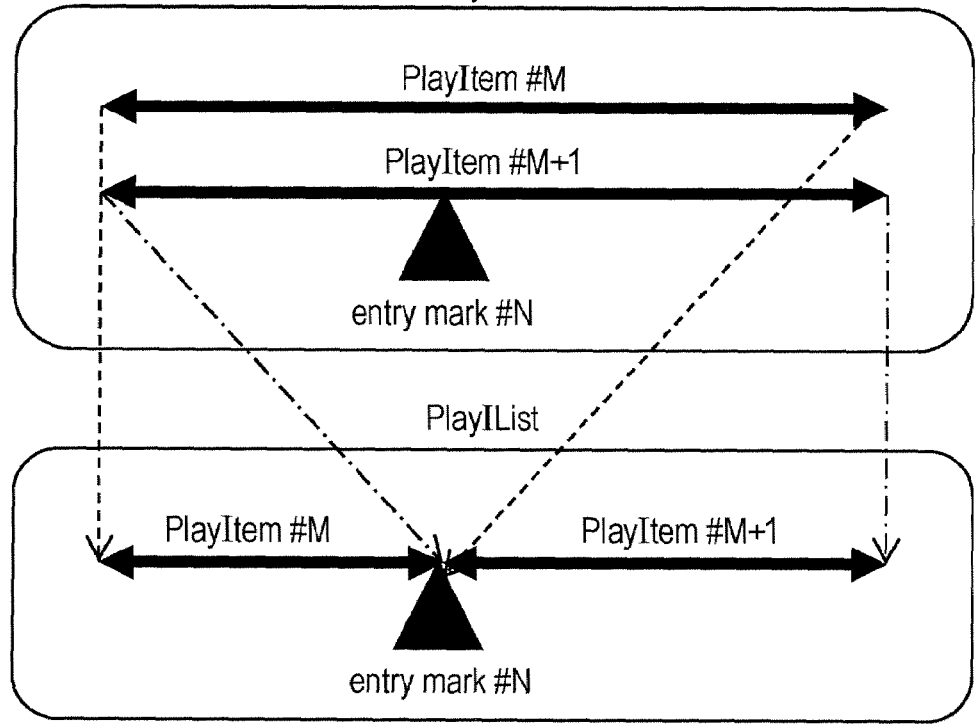
FIG. 6 is a diagram illustrating a state of dividing a play item.

FIG. 5 illustrates, in a flowchart form, a processing procedure for dividing a play item at a play-list mark position in the middle part thereof. Also, FIG. 6 illustrates a state of dividing a play item. Here, it is assumed that the division target is the M-th play item PlayItem#M in a play list, and the division is performed at the N-th play-list mark position entry mark#N in the play list.

When the division position is indicated by the entry mark#N, the corresponding PlayItem#M is identified from the reference information "ref_to_PlayItem_id" to the play item described by the entry mark#N (step S1).

Next, by the division of play item, the number of play items in the play list is increased by 1, and thus the number of play items "number_of_PlayItem" of the play list including the play item PlayItem#M is increased by 1 (step S2).

Next, the play item PlayItem#M to be divided is copied, and this is placed as the play item PlayItem#M+1 succeeding to the play item PlayItem#M (step S3).

Next, the end position "OUT_time" of the play item PlayItem#M is replaced by the time stamp "mark_time_stamp" of the entry mark#N, and is placed as the play item before the division entry mark#N. At the same time, the start position "IN_time" of the play item PlayItem#M+1 is replaced by the time stamp "mark_time_stamp" of the entry mark#N, and is placed as the play item after the division entry mark#N (step S4).

Next, together with this division, the play item referenced by the entry mark#N is changed to the play item PlayItem#M+1 after the division boundary, and thus the value of the reference information "ref_to_PlayItem_id" to the play item is increased by 1. This is the same for all the entry marks following #N (step S5).

Figure 7:
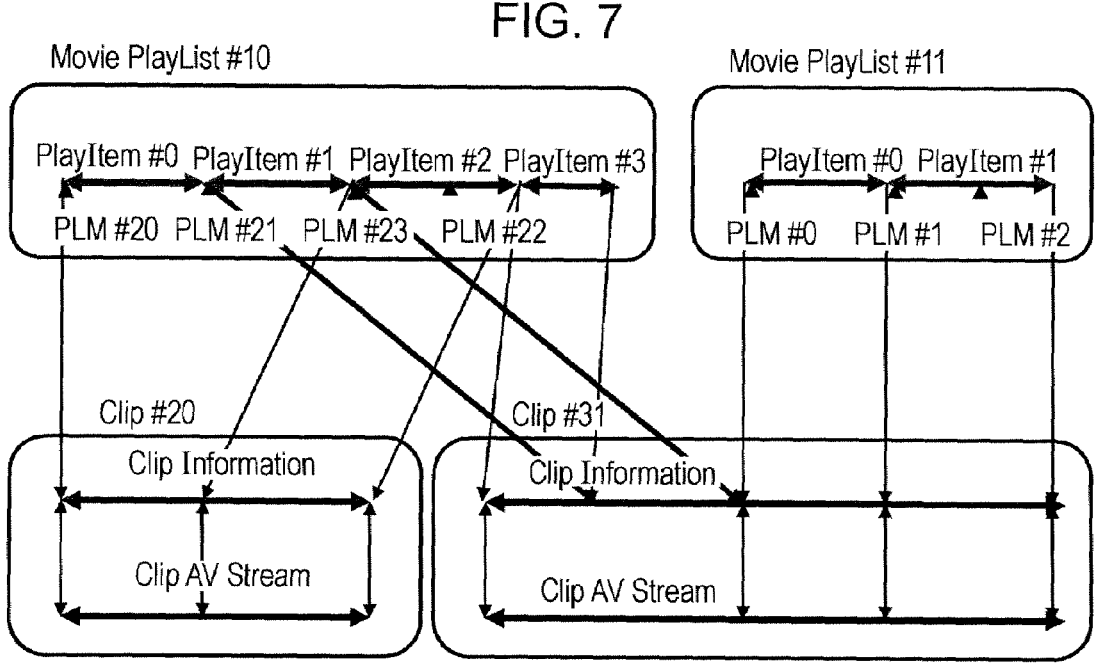
FIG. 7 is a diagram illustrating a state in which a play item divided using a chapter as a boundary is inserted at the beginning of a chapter specified as a moving destination, and a sequence number of each play item in a play list is set again in accordance with an order on a time axis.

In the example shown in FIG. 4, when an instruction is given that chapters of PLM#3 and after are moved before the play item PlayItem#1 to be rearranged, as shown in FIG. 7, the play item divided using a chapter as a boundary is inserted at the start point (play-list mark position) of the chapter instructed as a move destination. At the same time, the sequence number of each play item in the play list is reset in accordance with the sequence on the time axis (the value of the reference information "ref_to_PlayItem_id" to the play item of each entry mark is reset).

Of course, if the play-list mark position delimiting a chapter instructed to be moved matches both ends of a play item, the division processing of the play item is not necessary.

The move-destination of a chapter is specified by the start point of a chapter, that is to say, the play-list mark position. If the play-list mark position of a move-destination does not match a play-item boundary, it is not possible to insert the moved chapter without change, and thus, in the same manner as described above, a play item is divided at the play-list mark position of the move-destination.

Figure 8A:
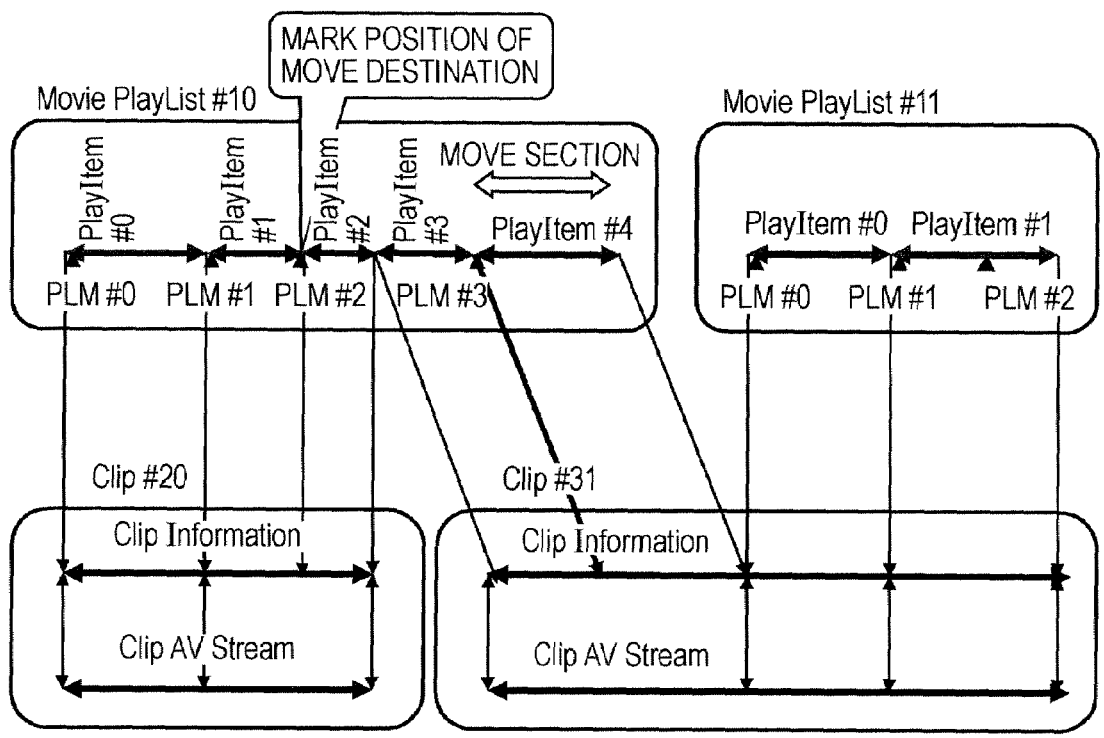
FIG. 8 is a diagram illustrating a state in which in order to insert a play item at a play-list mark position to be a move destination, the corresponding play item is divided at the play-list mark position.
Figure 8B:
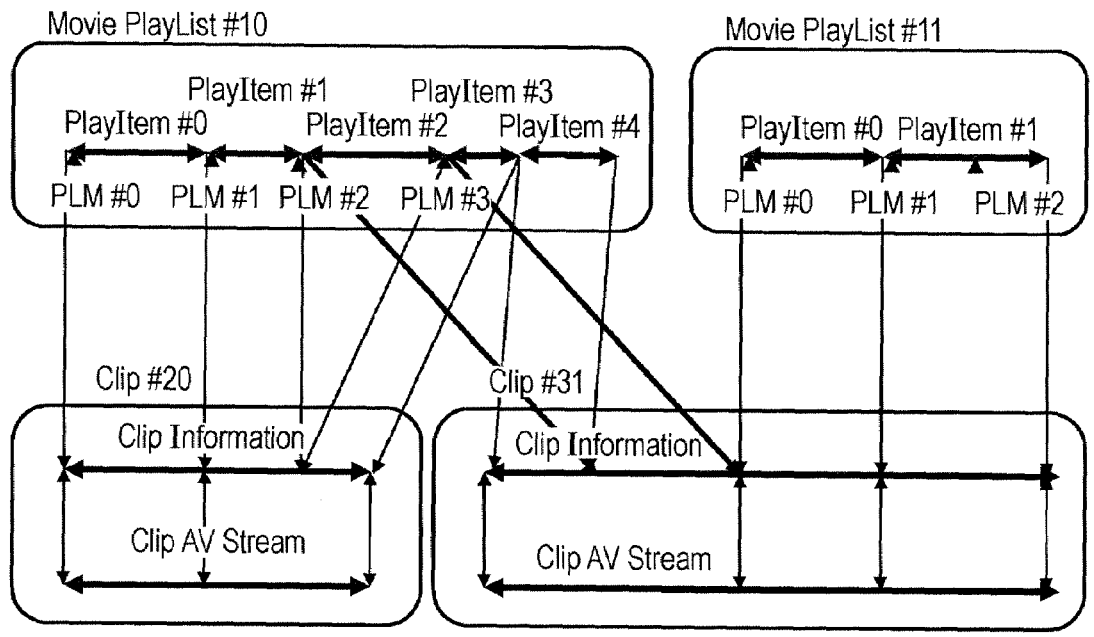

In the example shown in FIG. 4, the play-list mark position PLM#1 specified for a move-destination matches the boundary of the play item PlayItem#1, it is not necessary to perform the division processing of the move-destination play item. FIG. 8 illustrates a procedure when the play-list mark position PLM#2 is specified for the move destination as a modification. In FIG. 4B, in order to make it possible to move a chapter to be a move section, the play-list mark position PLM#2 is divided. However, in this modification, as shown in FIG. 8A, the play item PlayItem#1 is also divided at the play-list mark position PLM#1 to be a move destination, and the sequence numbers of individual play items are reset. As shown in 8B, the play item to be a move section is inserted at the play-list mark position, and the sequence numbers of individual play items are reset.

Also, when play items are rearranged, the moved play item is connected to the start point or the end point of adjacent play item either of the front end or back end, or at both ends. In the example shown in FIG. 7, the start point of the play item PlayItem#1 (corresponding to the play item PlayItem#3 in FIG. 4B) after the move is connected to the end point of the play item PlayItem#0, and at the same time, the end point of the play item PlayItem#1 is connected to the start point of the play item PlayItem#2 (corresponding to the play item PlayItem#1 in FIG. 4B).

Here, a description has already given that the connection condition can be set to seamless playback in accordance with the buffer state between adjacent play items. However, it is apparent that the buffer state between the play items connected at a move destination is not adjusted, and thus it is necessary to release the setting of seamless playback.

Figure 9A:
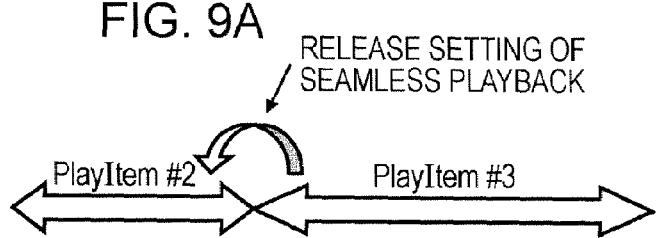
FIG. 9A is a diagram illustrating a state in which prior to moving a play item, a change is made of the setting of a connection condition of the beginning play item of a section to be moved with a play item immediate before.

Specifically, in the beginning play item of a section to be moved, if the connection condition (Connection Condition: CC) with the play item immediately before is set to seamless playback, this condition is released. Also, in the play item following the last point of a section to be moved, if the connection condition with the play item immediately before is set to seamless playback, this condition is released. In the example shown in FIG. 4B, before the play item is moved, seamless playback, which is set as a connection condition of the play item PlayItem#3 with the play item PlayItem#2 immediately before, is released (refer to FIG. 9A).

Figure 9B:
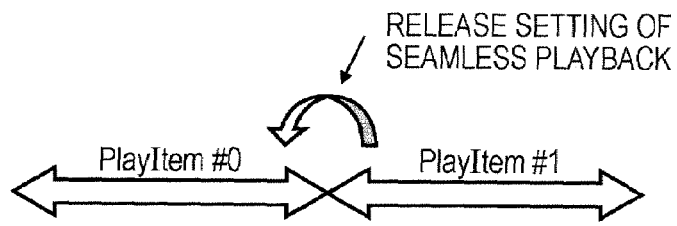
FIG. 9B is a diagram illustrating a state in which prior to moving a play item, a change is made of the setting of a connection condition of the beginning play item at the back of the move destination with a play item immediate before.

Also, in the beginning play item of a chapter to be a move destination, if the connection condition with the play item immediately before is set to seamless playback, this condition is released. In the example shown in FIG. 4B, before the play item is moved, seamless playback, which is set as a connection condition of the play item PlayItem#1 with the play item PlayItem#0 immediately before, is released (refer to FIG. 9B).

In this manner, in an information processing apparatus according to the present embodiment, by adopting the division processing procedure of an play item, it is possible to achieve rearrangement processing of streams for each chapter. Also, it is possible to move a chapter in the same play list or among a plurality of play lists, and to perform rearrangement editing (in the product specification, a plurality of real play lists are put together and presented to the user as a series of chapter group, and thus rearrangement of chapters is sometimes closed in the same play list, and sometimes extends over a plurality of play lists). Moreover, it is possible to perform rearrangement editing which moves a chapter between real play lists, between virtual play lists, and further from a real play list to a virtual play list.

Figure 10:
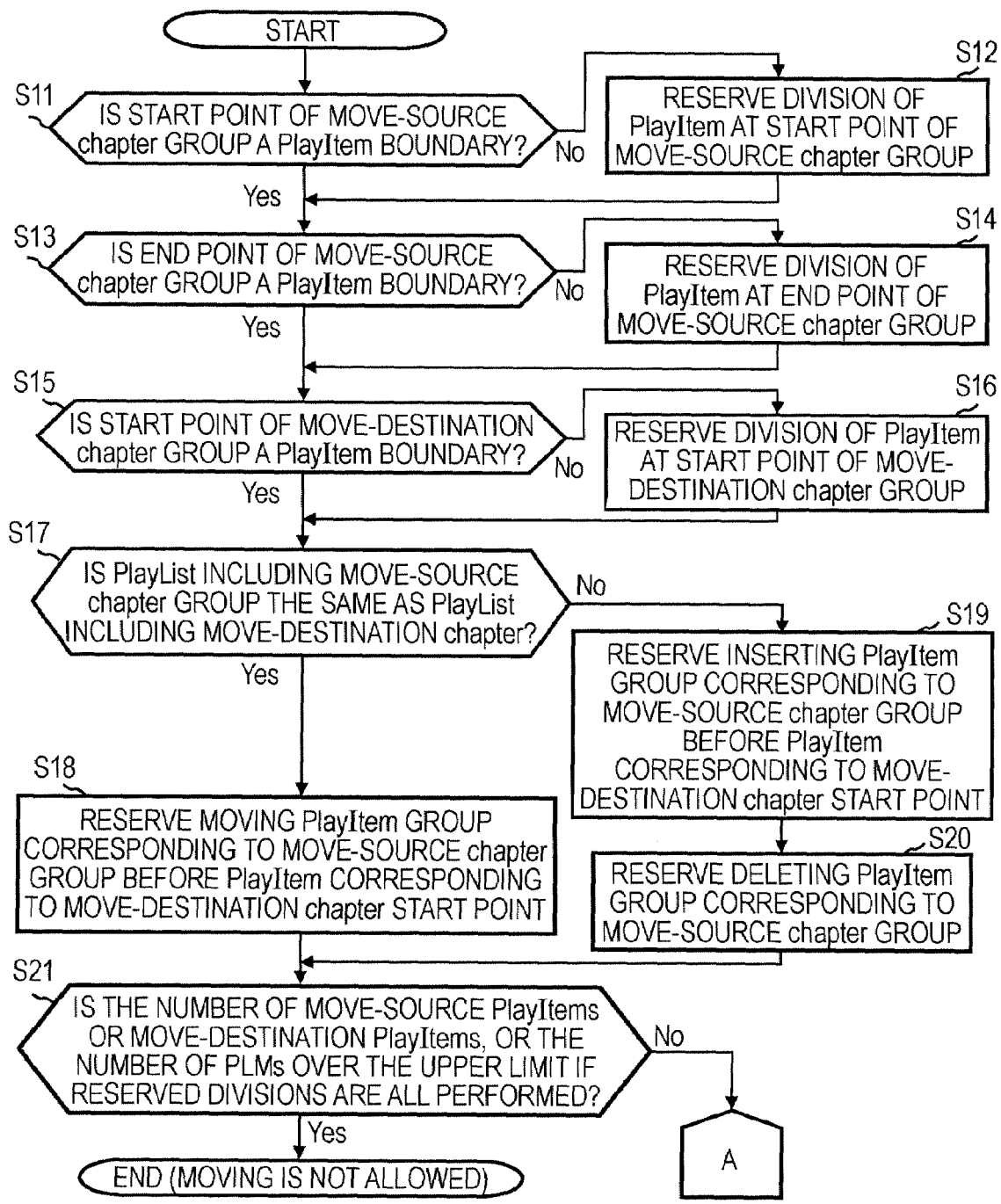
FIG. 10 is a flowchart illustrating a processing procedure for performing rearrangement edit which moves a chapter in the same play list or over a plurality of play lists.
Figure 11:
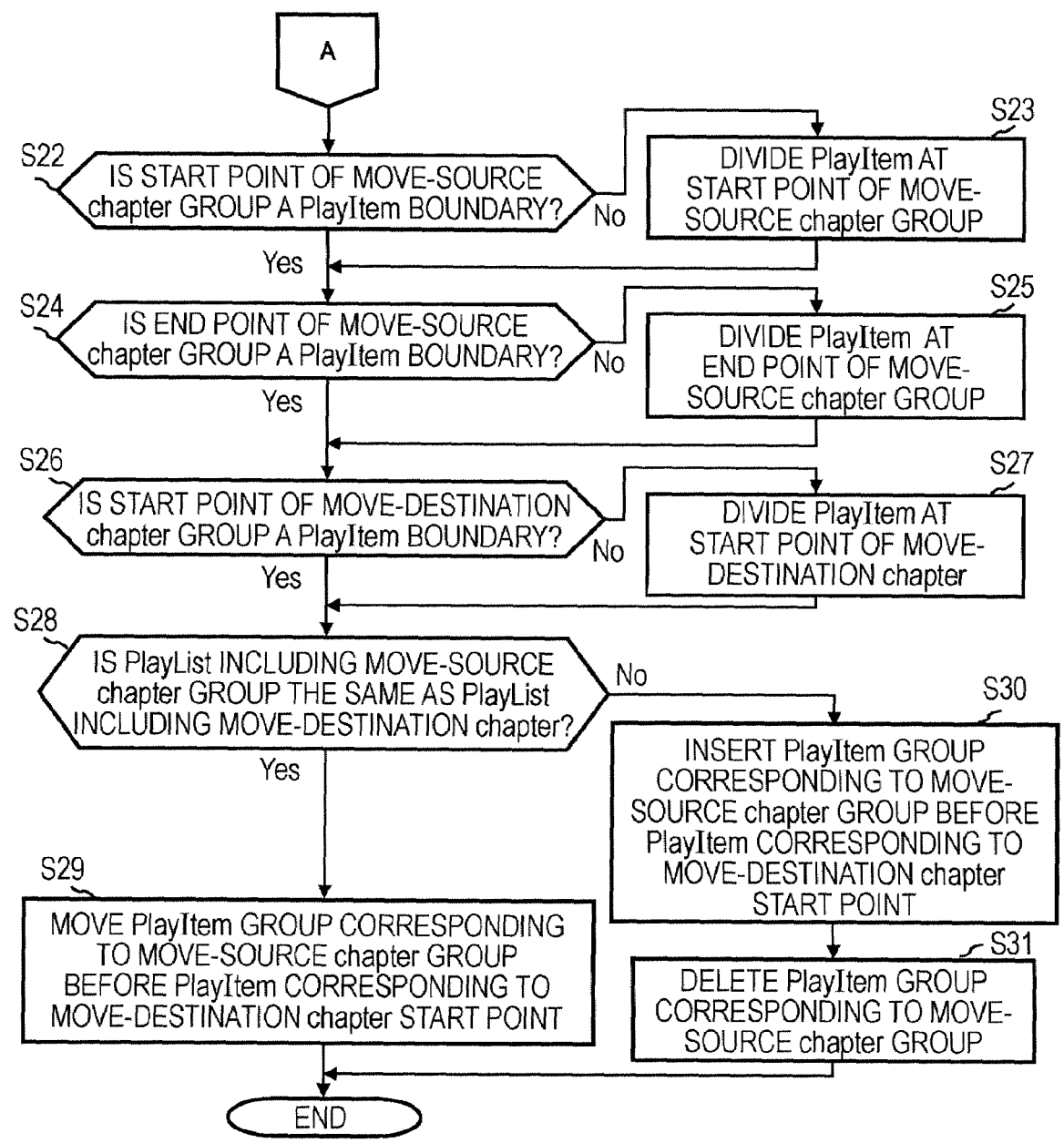
FIG. 11 is a flowchart illustrating a processing procedure for performing rearrangement edit which moves a chapter in the same play list or over a plurality of play lists.

FIG. 10 and FIG. 11 illustrates a processing procedure, in a flowchart format, for performing rearrangement editing which moves a chapter in the same play list or among a plurality of play lists. In this regard, it is possible to move a plurality of consecutive chapters by one-time rearrangement editing, but in the following, for the sake of convenience, an expression "chapter group" is used regardless of whether the number of chapters to be edited is one or plural.

If the start point of a move-source chapter group does not match a play-item boundary (step S11), division processing on the relevant play item at the start point of the move-source chapter group is reserved (step S12). In the same manner, if the end point of a move-source chapter group does not match a play-item boundary (step S13), division processing on the relevant play item at the end point of the move-source chapter group is reserved (step S14). Also, if the start point of a move-destination chapter does not match a play-item boundary (step S15), division processing on the relevant play item at the start point of the move-destination chapter is reserved (step S16).

Next, a check is made on whether the play list including a move-source chapter group is the same as the play list including a move-destination chapter, that is to say, whether the chapter group is moved in the same play list, or the chapter group is moved among a plurality of play lists (step S17).

If the chapter group is moved in the same play list (Yes in step S17), a reservation is made of the processing for moving a play item group corresponding to the move-source chapter group before a play item corresponding to a move-destination chapter start point (step S18).

At the same time, if the chapter group is moved among a plurality of play lists (No in step S17), a reservation is made of the processing for the processing for inserting a play item group corresponding to the move-source chapter group before a play item corresponding to a move-destination chapter start point (step S19), and a reservation is made of the processing for deleting the play item group corresponding to the move-source chapter group (step S20).

When the rearrangement extends over a plurality of play lists, the reason why the moving of chapter groups are carried out by the two phases, the insertion of chapter groups and the deletion of chapter group in this manner is that consideration is given to the design items of apparatuses which load data on a recording medium into a memory for each play list, and do not load the information of two play lists or more into a memory at the same time, and thus this is not indispensable configuration requirement for achieving the present invention.

If both ends of a move-source chapter group and the start point of a move-destination do not match the boundary of play items, respectively, the division of the play item and giving of a new play-list mark are accompanied. At the same time, as shown in FIG. 2, the maximum number of play items is limited on a recording medium. Thus, after reserving the above-described processing, a check is made on whether the number of play items and the number of play list marks are over an upper limit in the move-source play list and move-destination play list if the reserved divisions are all performed (step S21). If the upper limit is exceeded, an error is returned, and this processing routine terminates.

If the number of play items and the number of play list marks are not over an upper limit in the move-source play list (No in step S21), next, each of the reserved processing is performed.

If the start point of a move-source chapter group does not match a play item boundary (step S22), division processing is performed on the relevant play item at the start point of a move-source chapter group (step S23). In the same manner, if the end point of a move-source chapter group does not match a play item boundary (step S24), division processing is performed on the relevant play item at the end point of a move-source chapter group (step S25). Also, if the start point of a move-destination chapter group does not match a play item boundary (step S26), division processing is performed on the play item at the start point of a move-destination chapter group (step S27). A description has already been given of the division processing procedure of a play item with reference to FIG. 5, and thus the description will be omitted here.

Next, a check is made on whether the play list includes a move-source chapter group is the same as the play list including a move-destination chapter, that is to say, whether the chapter group is moved in the same play list, or the chapter group is moved among a plurality of play lists (step S28).

If the chapter group is moved in the same play list (Yes in step S28), a play item group corresponding to the move-source chapter group is moved before a play item corresponding to a move-destination chapter start point (step S29). The details of processing procedure for moving a chapter group in a play list will be described later.

At the same time, if the chapter group is moved among a plurality of play lists (No in step S28), a reservation is made of the processing for the processing for inserting a play item group corresponding to the move-source chapter group before a play item corresponding to a move-destination chapter start point (step S30), and the play item group corresponding to the move-source chapter group is deleted (step S31). The details of the processing procedure for inserting a play item group corresponding to the move-source chapter group before a play item corresponding to a move-destination chapter start point and the processing procedure for deleting the play item group corresponding to the move-source chapter group will be described later.

Figure 12:
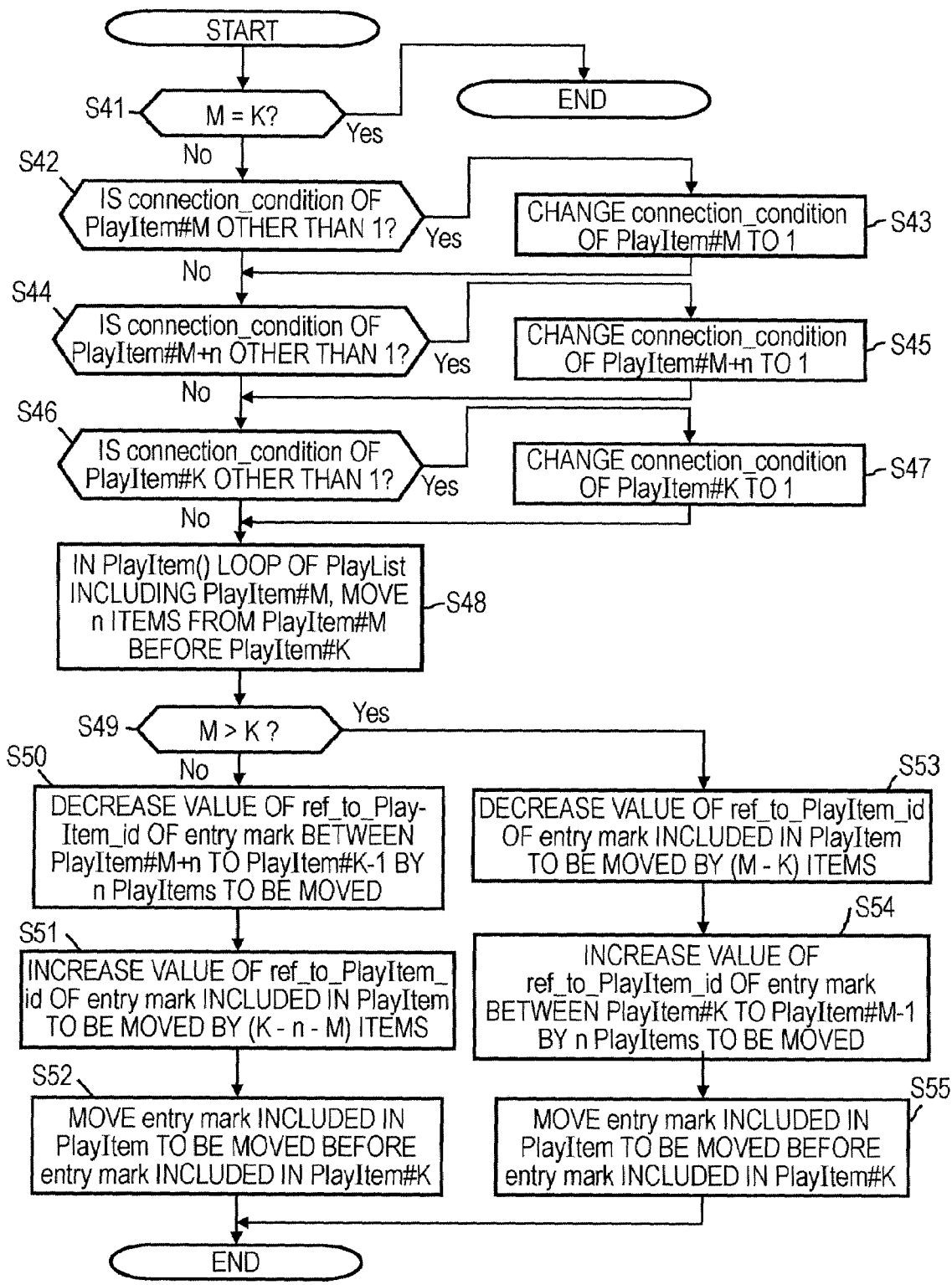
FIG. 12 is a flowchart illustrating a processing procedure for moving n play items PlayItem#M to n from the M-th item to the K-th play item, PlayItem#K in a certain play list.

FIG. 12 illustrates a processing procedure, in a flowchart form, for moving n play items starting from the M-th item, PlayItem#M to n, to the K-th play item, PlayItem#K in a certain play list. This processing procedure is executed, for example by step S29 in the flowchart shown FIG. 11.

First, whether M matches K or not is checked (step S41). If M matches K, the play-list mark positions of the move-source and the move-destination are the same, that is to say, there is no need to move, and thus this routine terminates.

Figure 13A:
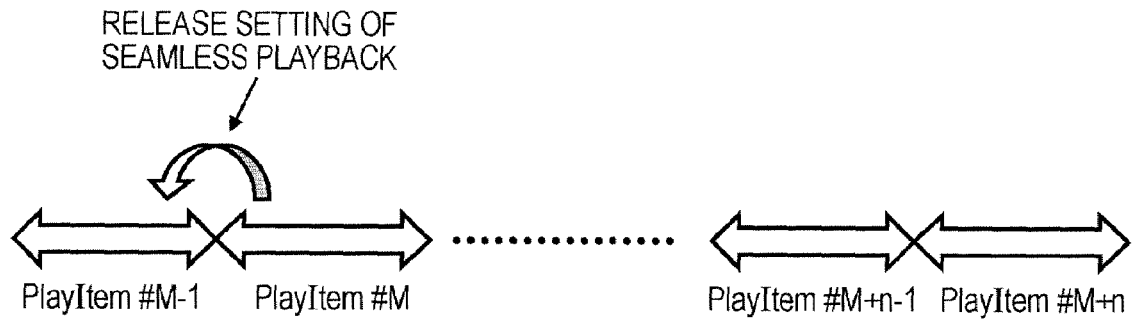
FIG. 13A is a diagram illustrating a state in which seamless playback set as a connection condition with an immediate-before play item is released in the play item PlayItem#M to be the beginning of the section to be moved.

Next, a check is made on the connection condition (connection_condition) with the play item PlayItem#M−1 immediately before, which is set in the play item PlayItem#M to be the beginning of the section to be moved (step S42). Here, if the connection condition is other than connection_condition=1, that is to say, if seamless playback is set, the processing proceeds to step S43, and in the play item PlayItem#M, the seamless playback set as the connection condition with the play item immediately before is released (refer to FIG. 13A). Specifically, connection_condition is changed to 1.

Figure 13B:
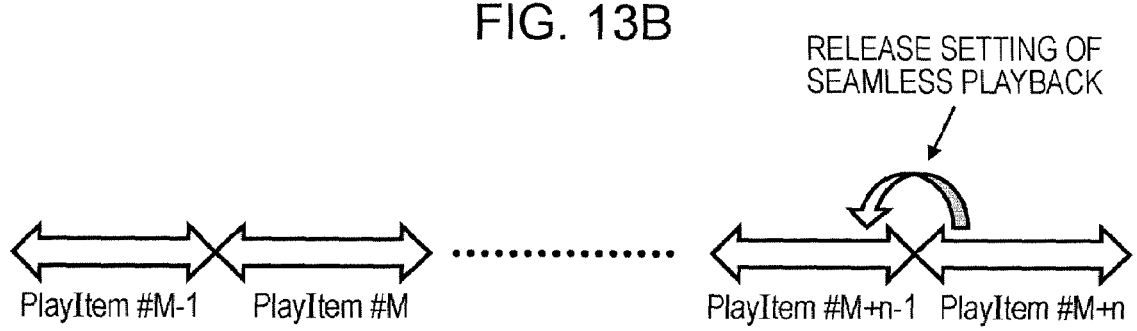
FIG. 13B is a diagram illustrating a state in which seamless playback set as a connection condition with an immediate-before play item is released in the play item PlayItem#M+n following the backmost of the section to be moved.

Next, a check is made on the connection condition (connection_condition) with the play item PlayItem#M+n−1 immediately before, which is set in the play item PlayItem#M+n following the end of the section to be moved (step S44). Here, if the connection condition is other than connection_condition=1, that is to say, if seamless playback is set, the processing proceeds to step S45, and in the play item PlayItem#M+n, the seamless playback set as the connection condition with the play item immediately before is released (refer to FIG. 13B). Specifically, connection_condition is changed to 1.

Figure 13C:
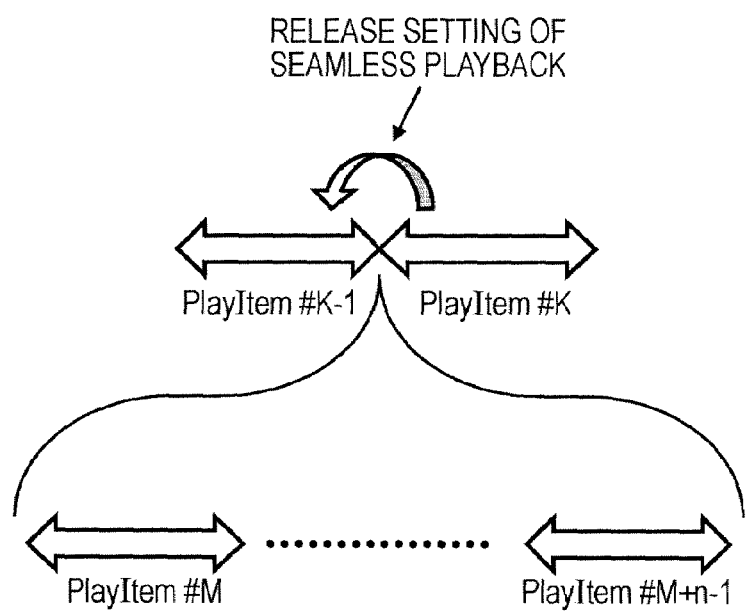
FIG. 13C is a diagram illustrating a state in which seamless playback set as a connection condition with an immediate-before play item is released in a play item PlayItem#K to be a start point of the chapter to be moved.

Next, a check is made on the connection condition (connection_condition) with the play item PlayItem#K−1 immediately before, which is set in the play item PlayItem#K following the end of the section to be moved (step S46). Here, if the connection condition is other than connection_condition=1, that is to say, if seamless playback is set, the processing proceeds to step S47, and in the play item PlayItem#K, the seamless playback set as the connection condition with the play item immediately before is released (refer to FIG. 13C). Specifically, connection_condition is changed to 1.

Next, in the play item ( ) loop of the play list including the play item PlayItem#M, n items are moved from the play item PlayItem#M before the play item PlayItem#K (step S48).

Next, M and K are compared (step S49), and a determination is made on whether the move is forward or backward in the chapter.

Figure 14A:
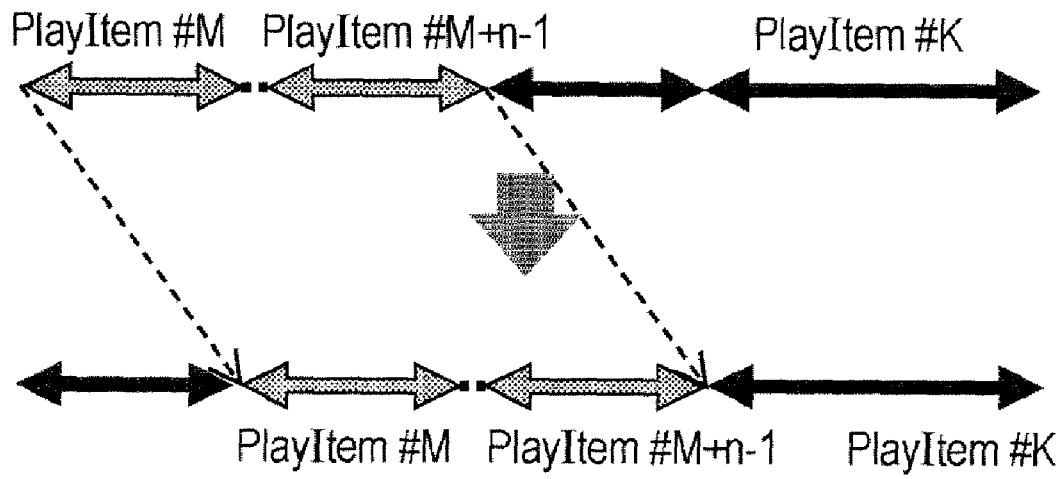
FIG. 14A is a diagram illustrating a state in which n items from the play item PlayItem#M are moved backward before the play item PlayItem#M.

In the case where M≦K, that is to say, the move is backward in the chapter (No in step 49), for the play items from the end of a move section to the move destination, the sequence numbers of the play items are decreased along with the move, and thus the values of the reference information, ref_to_PlayItem_id, to the play items of the entry marks included in the play item PlayItem#M+n to #K−1 are decreased by the number of move play items, n (step S50). Also, in the move section, the sequence numbers of the play items are increased by the amount of move backward, and thus the values of the reference information ref_to_PlayItem_id, to the play items of the entry marks included in the play items of the move section are increased by (K-m-M) (step S51). Then, the entry mark included in the play item to be moved is moved before the entry mark included in the play item PlayItem#K (step S52) (refer to FIG. 14A).

Figure 14B:
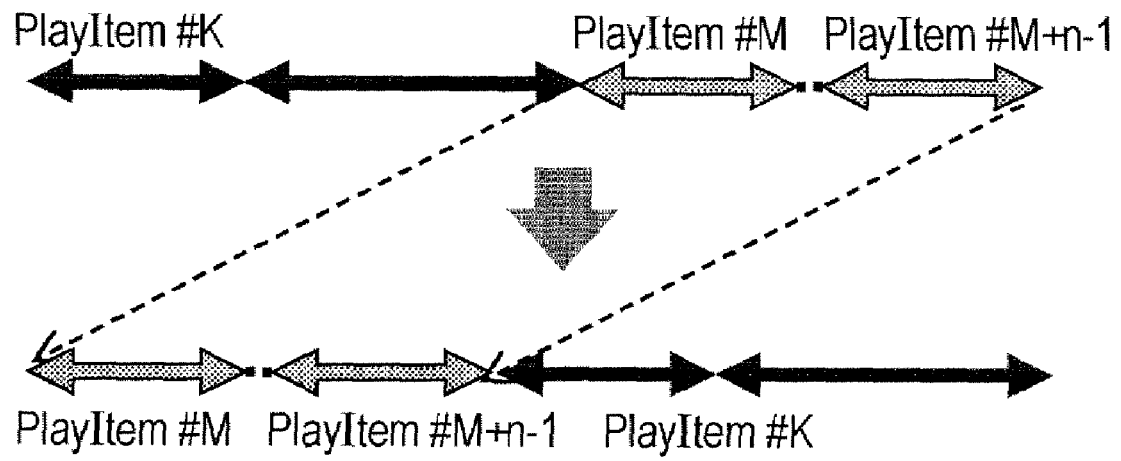
FIG. 14B is a diagram illustrating a state in which n items from the play item PlayItem#M are moved forward before the play item PlayItem#K.

In the case where M>K, that is to say, the move is forward in the chapter (Yes in step 49), for the play items of a move section, the sequence numbers of the play items are decreased by the amount of move forward, and thus the values of the reference information, ref_to_PlayItem_id, to the play items of the entry marks included in the play items of this section are decreased by the number of move play items, (M-K) (step S53). Also, in the section from the play item to be a start point of the chapter to be a move destination, the sequence numbers of the play items are increased by the number play items of the move section, and thus the values of the reference information ref_to_PlayItem_id, to the play items of the entry marks included in the play items of the move section are increased by n (step S54). Then, the entry mark included in the play item to be moved is moved before the entry mark included in the play item PlayItem#K to #M−1 (step S55) (refer to FIG. 14B).

Figure 15:
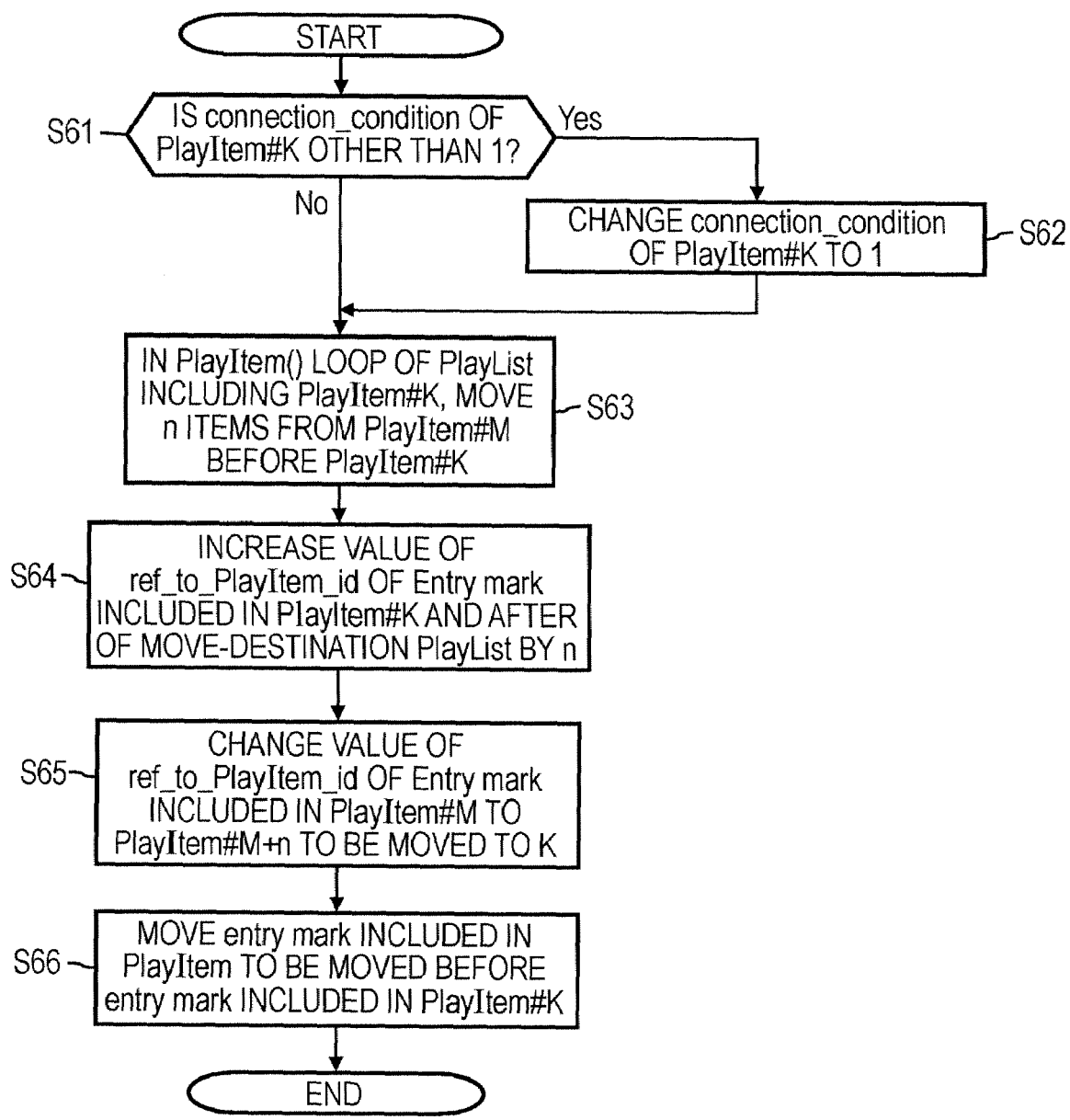
FIG. 15 is a flowchart illustrating a processing procedure for inserting a play item to be a section to be moved in a play list to be a move source to a play list to be a move destination in order to move a play item among a plurality of play lists.

FIG. 15 illustrates, in a flowchart form, a processing procedure for inserting a play item to be a section to be moved in a play list to be a move source to a play list to be a move destination in order to move a play item among a plurality of play lists. This processing procedure is executed, for example by step S30 in the flowchart shown FIG. 11. Note that it is assumed that the move section in the move-source play list includes n items, from the M-th, of the play items PlayItem#M to n, and the insert destination in the move-destination play list is before the K-th play item PlayItem#K.

First, in the play list of the move destination, a check is made on the connection condition (connection_condition) with the play item PlayItem#K−1 immediately before, which is set in the play item PlayItem#K to be the start point of the section to be a move destination (step S61).

Here, if the connection condition is other than connection_condition=1, that is to say, if seamless playback is set, the processing proceeds to step S62, and in the play item PlayItem#K, the seamless playback set as the connection condition with the play item immediately before is released. Specifically, connection_condition is changed to 1.

Next, in the play item ( ) loop of the play list (namely, move destination) including the play item PlayItem#K, n play items are inserted from the play item PlayItem#M before the play item PlayItem#K (step S63).

In the play items of the move section, the values of the reference information, ref_to_PlayItem_id, to the play items of the entry marks included in the play item PlayItem#M to #M+n−1 are changed to K (step S64). Also, in the backside of the move section, the sequence numbers of the play items are increased by the amount of play items to be newly inserted, and thus the values of the reference information, ref_to_PlayItem_id, to the play items of the entry marks included in the play items of the move section are increased by n (step S65).

Figure 16:
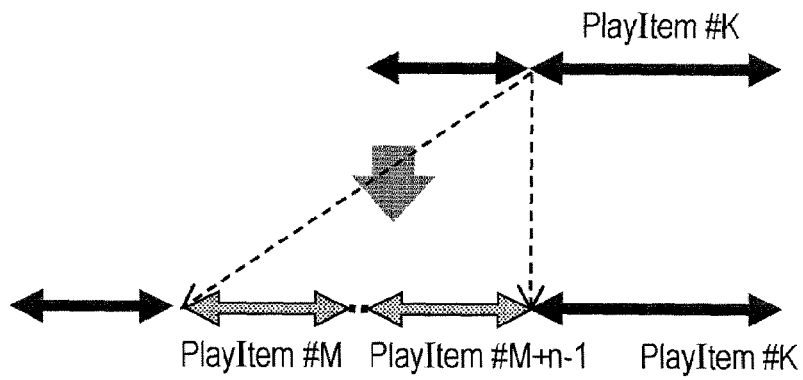
FIG. 16 is a flowchart illustrating a processing procedure for inserting a play item to be a section to be moved in a play list to be a move source to a play list to be a move destination in order to move a play item among a plurality of play lists.

Then, the entry marks included in the play item to be moved are moved before the entry mark included in the play item PlayItem#K (step S66) (refer to FIG. 16).

Figure 17:
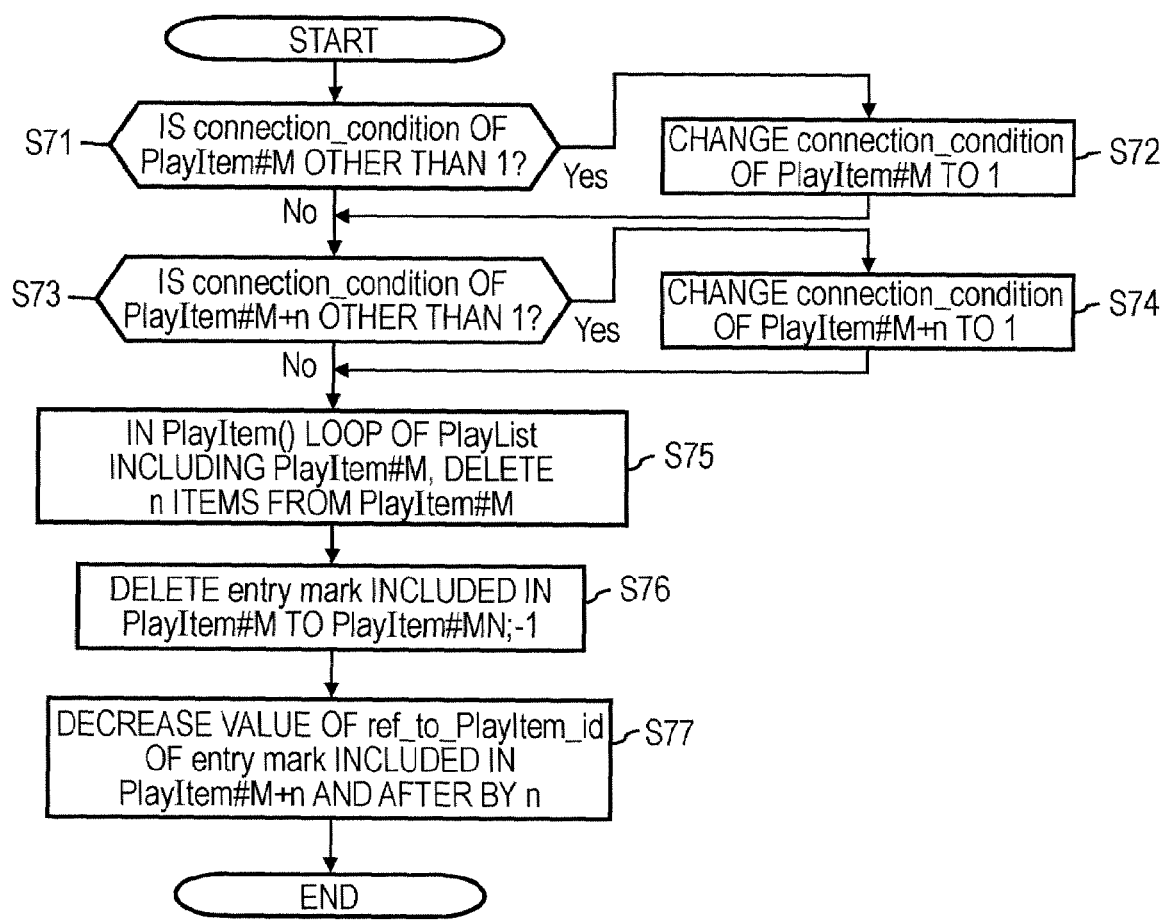
FIG. 17 is a flowchart illustrating a processing procedure for deleting a play item having been a move section from a play list of a move source.

FIG. 17 illustrates, in a flowchart form, a processing procedure for deleting a play item has been a move section from a play list of a move source. This processing procedure is executed after the play item to be a move section is inserted into a play list to be a move destination, for example by step S31 in the flowchart shown FIG. 11. Note that it is assumed that the move section in the move-source play list includes n items, from the M-th, of the play items PlayItem#M to n, and the insert destination in the move-destination play list is before the K-th play item PlayItem#K.

First, a check is made on the connection condition (connection_condition) with the play item PlayItem#M−1 immediately before, which is set in the play item PlayItem#M to be the beginning of the section to be moved (step S71). Here, if the connection condition is other than connection_condition=1, that is to say, if seamless playback is set, the processing proceeds to step S72, and in the play item PlayItem#M, the seamless playback set as the connection condition with the play item immediately before is released.

Next, a check is made on the connection condition (connection_condition) with the play item PlayItem#M+n−1 immediately before, which is set in the play item PlayItem#M+n following the end of the section to be moved (step S73). Here, if the connection condition is other than connection_condition=1, that is to say, if seamless playback is set, the processing proceeds to step S74, and in the play item PlayItem#M+n, the seamless playback set as the connection condition with the play item immediately before is released.

Next, in the play item ( ) loop of the play list including the play item PlayItem#M, n items are deleted from the play item PlayItem#M (step S75).

Next, the entry marks included in the play items PlayItem#M to #M+n−1 are deleted (step S76).

Next, the values of the reference information, ref_to_PlayItem_id, to the play items of the entry marks included in the play items PlayItem#M+n and after are decreased by n (step S77).

INDUSTRIAL APPLICABILITY

In the above, a detailed description has been given of the present invention with reference to the specific embodiment. However, it is apparent that those skilled in the art can make modifications and substitutions of the embodiments without departing from the spirit and the scope of the present invention.

In this specification, a description has been mainly given of an embodiment in which a clip AV stream recorded on a recording medium following the AVCHD standard is subjected to rearrangement editing in conformity with the AVCHD standard. However, the gist of the present invention is not limited to this. In the same manner, the present invention can be applied to the case where a clip information file is provided as a pair with a stream file, the clip information has a description of the stream information necessary for playing the stream, and edit processing is performed on a recording medium recorded in a data format including play list formed by arranging play items having play sections of the stream file on a time axis.

In summary, the present invention has been disclosed in the form of exemplification, and the contents of this specification should not be construed in a limiting sense. In order to determine the spirit and the scope of the present invention, the appended claims should be considered.

The invention claimed is:

1. An information processing apparatus for performing edit control of one or more AV streams recorded on a recording medium, the information apparatus comprising:
   edit control means for editing a play list including an attribute definition file defining an AV stream attribute provided as a pair with each AV stream file recorded on a recording medium and a plurality of play section items specifying a play section of an AV stream by a play start point and a play end point;
   access control means for placing one or more entry marks to randomly access play-section items arranged on a time axis in the play list, forming a plurality of chapters as sections within the plurality of play section items between adjacent entry marks and a section from a last entry mark to an end point of a last play-section item in the play list, and accessing an AV stream recorded on a recording medium for each chapter; and play-list dividing means for dividing a play section item based on the location of entry marks within the play section item to generate new play section items corresponding to the plurality of chapters contained within the play section item, the play-list dividing means dividing the play section item when at least one of entry mark positions of front and back ends of a chapter specified as a division section does not match a boundary of the play-section item.

2. The information processing apparatus according to claim 1, further comprising:

play-section item deletion means for deleting the chapter specified as the division section.

3. The information processing apparatus according to claim 2, wherein when at least one of entry mark positions of front and back ends of a chapter specified as a division section does not match a boundary of the play-section item, the play-list dividing means once divides the play-section item including a deletion section at the entry mark position, and then the play-section item deletion means deletes the play-section item corresponding to the deletion section.

4. The information processing apparatus according to claim 2, further comprising:

play-section item insertion means for inserting one or more play-section items at the beginning position of a specified chapter specified in the play list.

5. The information processing apparatus according to claim 4, wherein when a beginning entry mark position of a chapter specified as an insertion position of the play-section item does not match a boundary of the play-section item, the play-list dividing means divides the play-section item at the entry mark position, and then the play-section item insertion means inserts play-section item before the entry mark position.

6. The information processing apparatus according to claim 4, further comprising:

play-section item rearrangement means for causing the play-list dividing means to divide a chapter of a section specified for rearrangement in response to an instruction for rearranging the chapter, and for moving the divided play-section item to the beginning position of a chapter specified for a move destination.

7. The information processing apparatus according to claim 1, wherein the play-list dividing means makes a copy of the play-section item to be divided, rewrites a play end position of the original play-section item to the entry mark position, and rewrites a play start position of the copied play-section item to the entry mark position.

8. The information processing apparatus according to claim 1, wherein the play-section item has information indicating whether a connection condition with play-section items immediately before is seamless-playable, and the play-list dividing means releases a seamless-playback setting of the beginning play-section item of a division section with play-section items immediately before, and releases a seamless-playback setting of the beginning play-section item of a backside of the division section with play-section items immediately before.

9. The information processing apparatus according to claim 2, wherein the play-section item has information indicating whether a connection condition with play-section items immediately before is seamless-playable, and the play-section item deletion means releases a seamless-playback setting of the beginning play-section item of a backside of the deletion section with play-section items immediately before.

10. The information processing apparatus according to claim 4, wherein the play-section item has information indicating whether a connection condition with play-section items immediately before is seamless-playable, and the play-section item insertion means releases a seamless-playback setting of the beginning play-section item of a backside of the insertion position with play-section items immediately before.

11. The information processing apparatus according to claim 6, wherein when the play-section item rearrangement means rearranges chapters among a plurality of play lists, the play-section item rearrangement means divides a chapter in a section instructed to be rearranged in a move-source play list by the play-list dividing means, then inserts the divided play-section item at the beginning position of a chapter specified for a move destination in a move-destination play list by the play-section item insertion means, and deletes the divided play-section item from the move-source play list by the play-section item deletion means.

12. The information processing apparatus according to claim 11, wherein an upper limit of the number of play-section items is set on a recording medium, and the play-section data rearrangement means reserves division processing by the play-list dividing means, reserves insertion processing by the play-list insertion means, reserves deletion processing by the play-section item deletion means, and executes each reserved processing when a total number of the play-section items is not over the condition in the move-source and the move-destination play lists.

13. The information processing apparatus according to claim 1, wherein each play-section item in a play list has each sequence number, and each entry mark has reference information to a sequence number of the corresponding play-section item, and the play-list dividing means rewrites the sequence number held by the play-section item and the reference information to the play-section item held by the entry mark from the divided entry mark and after.

14. The information processing apparatus according to claim 2, wherein each play-section item in a play list has each sequence number, and each entry mark has reference information to a sequence number of the corresponding play-section item, and the play-section item deletion means rewrites the reference information to the play-section item held by the entry mark in relation to deletion of the play-section item.

15. The information processing apparatus according to claim 4, wherein each play-section item in a play list has each sequence number, and each entry mark has reference information to a sequence number of the corresponding play-section item, and the play-section data insertion means rewrites the reference information to the play-section item of the entry mark in relation to insertion of the play-section item.

16. The information processing apparatus according to claim 6, wherein each play-section item in a play list has each sequence number, and each entry mark has reference information to a sequence number of the corresponding play-section item, and the play-section data rearrangement means rewrites the reference information to the play-section item of the entry mark in relation to moving the play-section item in the play-section item.

17. A method of information processing, implemented by an information processing apparatus, for performing edit control of one or more AV streams recorded on a recording medium, the method comprising:

editing a play list including an attribute definition file defining an AV stream attribute provided as a pair with each AV stream file recorded on a recording medium and a plurality of play section items specifying a play section of an AV stream by a play start point and a play end point;

placing one or more entry marks for a user randomly accessing play-section items arranged on a time axis in the play list;

forming a plurality of chapters as sections within the plurality of play section items between adjacent entry marks and a section from a last entry mark to an end point of a last play-section item in the play list;

accessing an AV stream recorded on a recording medium for each chapter;

dividing, at a play-list divider and via a processor device, a play section item based on the location of entry marks within the play section item to generate new play section items corresponding to the plurality of chapters contained within the play section item; and dividing, at the play-list divider, the play section item when at least one of entry mark positions of front and back ends of a chapter specified as a division section does not match a boundary of the play-section item.

18. A non-transitory computer-readable medium storing computer readable instructions thereon for performing edit control of one or more AV streams recorded on a recording medium, the instructions when executed by a computer causing the computer to perform a method comprising:

editing a play list including an attribute definition file defining an AV stream attribute provided as a pair with each AV stream file recorded on a recording medium and a plurality of play section items specifying a play section of an AV stream by a play start point and a play end point;

placing one or more entry marks for a user randomly accessing play-section items arranged on a time axis in the play list;

forming a plurality of chapters as sections within the plurality of play section items between adjacent entry marks and a section from a last entry mark to an end point of a last play-section item in the play list;

accessing an AV stream recorded on a recording medium for each chapter;

dividing a play section item based on the location of entry marks within the play section item to generate new play section items corresponding to the plurality of chapters contained within the play section item; and dividing the play section item when at least one of entry mark positions of front and back ends of a chapter specified as a division section does not match a boundary of the play-section item.

19. An information processing apparatus for performing edit control of one or more AV streams recorded on a recording medium, the information apparatus comprising:

an edit controller configured to edit a play list including an attribute definition file defining an AV stream attribute provided as a pair with each AV stream file recorded on a recording medium and a plurality of play section items specifying a play section of an AV stream by a play start point and a play end point;

an access controller configured to place one or more entry marks for a user randomly accessing play-section items arranged on a time axis in the play list, form a plurality of chapters as sections within the plurality of play section items between adjacent entry marks and a section from a last entry mark to an end point of a last play-section item in the play list, and access an AV stream recorded on a recording medium for each chapter; and a play-list divider configured to, via a processor, divide a play section item based on the location of entry marks within the play section item to generate new play section items corresponding to the plurality of chapters contained within the play section item, the play-list divider dividing the play section item when at least one of entry mark positions of front and back ends of a chapter specified as a division section does not match a boundary of the play-section item.

* * * * *